US009420156B2

(12) United States Patent
Ono

(10) Patent No.: US 9,420,156 B2
(45) Date of Patent: Aug. 16, 2016

(54) IMAGING CONTROL SYSTEM, CONTROL APPARATUS, CONTROL METHOD, AND STORAGE MEDIUM

(71) Applicant: CANON KABUSHIKI KAISHA, Tokyo (JP)

(72) Inventor: Michihiko Ono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/703,480

(22) Filed: May 4, 2015

(65) Prior Publication Data

US 2015/0237244 A1    Aug. 20, 2015

Related U.S. Application Data

(63) Continuation of application No. 13/221,537, filed on Aug. 30, 2011, now Pat. No. 9,055,205.

(30) Foreign Application Priority Data

Sep. 3, 2010   (JP) .................................. 2010-197840
Sep. 6, 2010   (JP) .................................. 2010-198775

(51) Int. Cl.
*H04N 5/222*   (2006.01)
*H04N 5/225*   (2006.01)
*H04N 5/232*   (2006.01)

(52) U.S. Cl.
CPC ......... *H04N 5/2259* (2013.01); *H04N 5/23203* (2013.01); *H04N 5/23216* (2013.01)

(58) Field of Classification Search
CPC .......... H04N 5/23293; H04N 5/23216; H04N 1/00411; H04N 1/0048; H04N 1/00161; H04N 1/00458; H04N 1/0044; H04N 1/00461; H04N 5/2259; G06F 3/048; G06F 3/04845
USPC ........................ 348/333.01–333.13
See application file for complete search history.

(56) References Cited

U.S. PATENT DOCUMENTS

| | | | |
|---|---|---|---|
| 2003/0210329 A1 | 11/2003 | Aagaard | |
| 2004/0141089 A1* | 7/2004 | Wada | F16M 11/105 348/375 |
| 2009/0041378 A1* | 2/2009 | Yamaoka | G06T 5/006 382/275 |
| 2009/0096910 A1* | 4/2009 | Yasuda | G06F 3/0346 348/333.01 |
| 2009/0115881 A1* | 5/2009 | Joo | H04N 5/2252 348/333.06 |
| 2010/0085469 A1* | 4/2010 | Takemasa | H04N 5/232 348/345 |
| 2010/0103311 A1* | 4/2010 | Makii | G06T 7/0057 348/369 |
| 2011/0007129 A1* | 1/2011 | Martin | G06F 17/30017 348/36 |
| 2011/0050915 A1* | 3/2011 | Wang | H04N 5/232 348/207.99 |
| 2012/0007999 A1* | 1/2012 | Horii | H04N 5/232 348/211.4 |

FOREIGN PATENT DOCUMENTS

EP   0528422 A2   2/1993
EP   1950954 A1   7/2008

* cited by examiner

*Primary Examiner* — Chia-Wei A Chen
(74) *Attorney, Agent, or Firm* — Canon U.S.A., Inc. IP Division

(57) ABSTRACT

A control apparatus for controlling an imaging apparatus capable of changing an imaging direction of an imaging unit in panning and tilting directions includes an acquisition unit configured to acquire a captured image captured by the imaging unit, and an provision unit configured to provide, together with the captured image, when the imaging direction of the imaging unit coincides with a panning rotational axis for rotating the imaging direction in the panning direction, a panning direction guide for indicating that changing the imaging direction in the panning direction rotates the captured image around an intersection of an optical axis of the imaging unit and a plane containing the captured image.

12 Claims, 16 Drawing Sheets

IMAGING CONTROL SYSTEM, CONTROL APPARATUS, CONTROL METHOD, AND STORAGE MEDIUM

CROSS REFERENCE TO RELATED APPLICATIONS

The present application is a continuation of U.S. patent application Ser. No. 13/221,537, filed on Aug. 30, 2011, the content of which is expressly incorporated by reference herein in its entirety. This application also claims the benefit of Japanese Patent Applications No. 2010-197840 filed Sep. 3, 2010 and No. 2010-198775 filed Sep. 6, 2010, which are hereby incorporated by reference herein in their entirety.

BACKGROUND OF THE INVENTION

1. Field of the Invention

The present invention relates to an imaging control system for controlling an imaging apparatus, an apparatus and a method for controlling the imaging apparatus, and a storage medium.

2. Description of the Related Art

A conventional imaging control system includes an imaging apparatus connected to a network and a client apparatus which controls the imaging apparatus via the network. The imaging control system can control panning and tilting drive mechanisms of the imaging apparatus through operations on the client apparatus. A known imaging control system is directed, when driving an imaging apparatus for panning and tilting, to making it easier for a user to orient the imaging apparatus in the direction of a target object (for example, Japanese Patent Application Laid-Open No. 2004-266876). The imaging control system stores in a memory of an imaging apparatus a table for setting a relation between the panning angle and name display characters such as "North", "South", "East", and "West." The imaging control system orients the imaging apparatus to a panning angle corresponding to a name display character input by a user, and displays on a monitor the name display character corresponding to the direction to which the imaging apparatus is oriented.

A known method displays buttons for indicating the panning and tilting directions at predetermined positions around a captured image (for example, Japanese Patent Application Laid-Open No. 4-373386 and Japanese Patent Application Laid-Open No. 8-237533). However, there has been a case where the conventional method cannot suitably show a user the imaging direction since the panning and tilting directions dynamically change in response to operations of the panning, tilting, and rotation mechanisms.

As a method for assisting the user to orient the imaging direction of the imaging apparatus to a target direction when driving the imaging apparatus for panning and tilting, the panning and tilting drive directions may be possibly superimposed onto the captured image, as illustrated in FIG. 9A. When the user changes the imaging direction of the imaging apparatus to the panning or tilting direction, the method illustrated in FIG. 9A superimposes onto the captured image as direction guides 913 and 914 a moving path to be traced by an imaging center 911 which is an intersection of a plane containing the captured image and an optical axis 901 of the imaging apparatus. However, when superimposing the panning and tilting drive directions, there arises a problem that the user cannot recognize the panning and tilting drive directions in a specific imaging direction in some cases.

A problem arising in drive direction display will be described below. Modes for displaying the drive direction on a display image and a change in panning direction display accompanying the operation of the tilting mechanism will be described below with reference to FIGS. 9A and 9B.

Referring to FIG. 9A, the optical axis 901 denotes an imaging direction of an imaging apparatus, a display image 910 denotes an image displayed on a display apparatus, an imaging center 911 denotes a center of the captured image, and a panning rotation center 912 denotes the position of a panning rotation center on the display image 910. Referring to FIG. 9A, a panning direction guide 913 is a panning direction guide for indicating the panning drive direction by the panning drive mechanism, and a tilting direction guide 914 is a tilting direction guide for indicating the tilting drive direction by the tilting drive mechanism. Each of the panning direction guide 913 and the tilting direction guide 914 is represented by a straight line or curve passing through the imaging center 911. Each of the direction guides 913 and 914 dynamically changes in shape with the changing imaging direction, i.e., according to operations of the panning, tilting, and rotation mechanisms.

As illustrated in FIG. 9A, the closer the optical axis 901 is to the perpendicular to the panning rotational axis 203, the straighter the panning direction guide 913 and the smaller its curvature. FIG. 9B illustrates a display image 920 produced when the tilting mechanism is operated from the state of the optical axis 901 to bring the imaging direction close to the panning rotational axis 203. As illustrated in FIG. 9B, the closer the imaging direction is to the panning rotational axis 203, the shorter the distance between the imaging center 911 and the panning rotation center 912 and the larger the curvature of the panning direction guide 913 on the display image 920. When the imaging direction is close to the panning rotational axis 203, the panning direction guide 913 forms a circle or arc having a small radius, making it difficult for the user to recognize the panning drive direction. If the imaging apparatus 110 continues the tilting operation from the above-mentioned state, the panning direction guide 913 converges to a point and can no longer be displayed when the imaging direction coincides with the panning rotational axis 203. In this state, the user cannot recognize the panning drive direction.

As mentioned above, when the panning direction guide 913 and the tilting direction guide 914 are superimposed onto the captured image such that these direction guides pass through the center of the captured image, it becomes difficult or impossible for the user to recognize the panning moving direction. In this state, the user may be confused when attempting to adjust the orientation of the imaging apparatus 110 with a desired imaging direction.

SUMMARY OF THE INVENTION

The present invention is directed to making it easier for a user to recognize drive directions of an imaging apparatus when attempting to adjust the orientation of the imaging apparatus with a desired imaging direction.

According to an aspect of the present invention, a control apparatus for controlling an imaging apparatus capable of changing an imaging direction of an imaging unit in panning and tilting directions includes an acquisition unit configured to acquire a captured image captured by the imaging unit, and a provision unit configured to provide, together with the captured image, when the imaging direction of the imaging unit coincides with a panning rotational axis for rotating the imaging direction in the panning direction, a panning direction guide for indicating that changing the imaging direction in the panning direction rotates the captured image around an imaging center which is an intersection of an optical axis of the imaging unit and a plane containing the captured image.

According to an exemplary embodiment of the present invention, superimposing a panning direction guide not overlapping an imaging center onto a captured image makes it easier for the user to recognize drive directions of the imaging apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
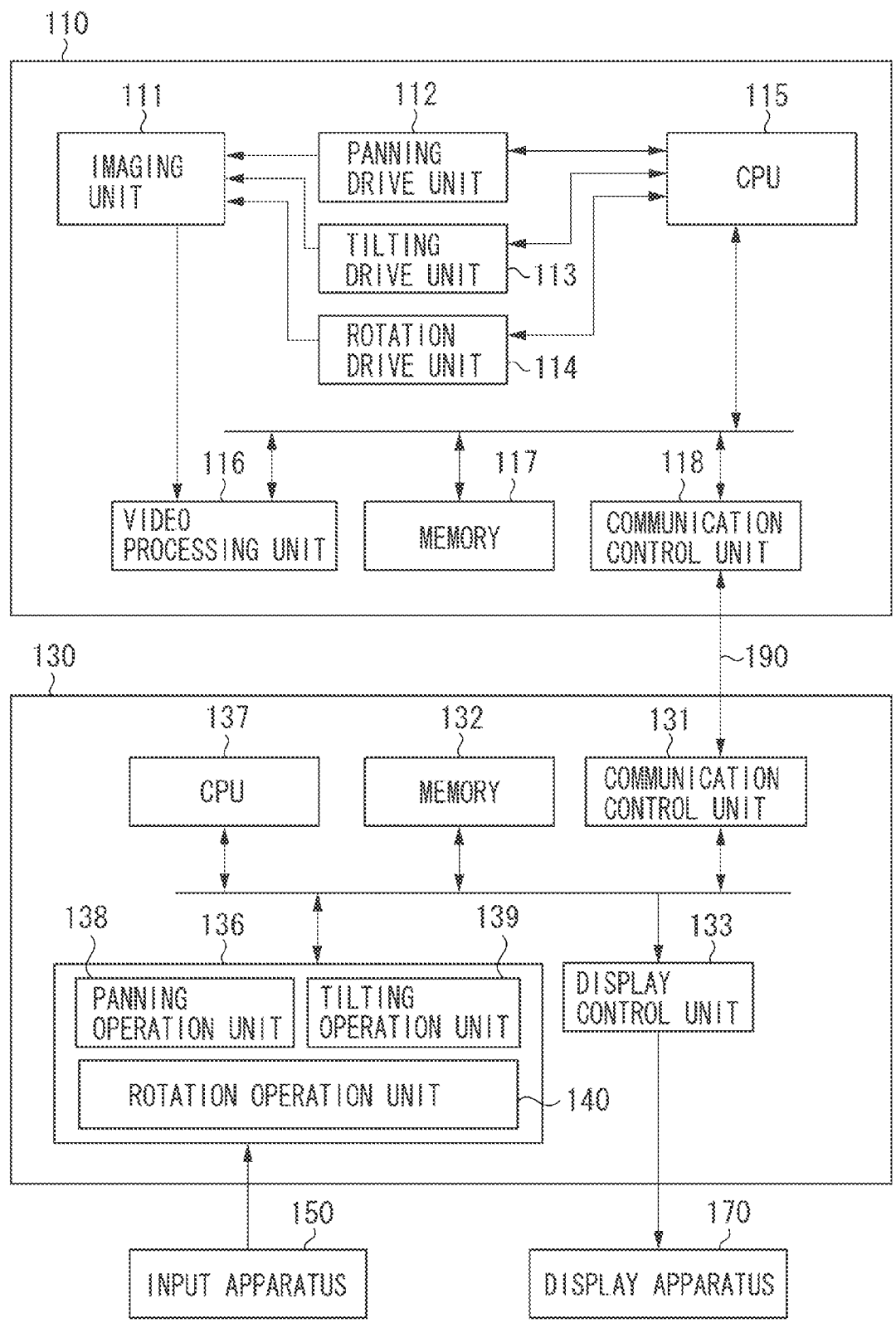
FIG. 1 is a block diagram illustrating an imaging control system according to first and second exemplary embodiments of the present invention.

FIG. 1 is a block diagram illustrating an imaging control system according to a first exemplary embodiment of the present invention. Referring to FIG. 1, an imaging apparatus 110 captures an image. A client apparatus 130 sets up the imaging apparatus 110, and displays and records the captured image. A network 190 connects the imaging apparatus 110 to the client apparatus 130. The network 190 includes a plurality of routers, switches, and cables satisfying, for example, Ethernet and other communications standards. The present exemplary embodiment is based on any communication standard, scale, and configuration as long as communications between respective servers and clients are achieved. For example, the network 190 may be composed of any one of the Internet, a wired local area network (LAN), a wireless LAN, and a wide area network (WAN).

A configuration of the imaging apparatus 110 according to the present exemplary embodiment will be described below. An imaging unit 111 includes an image sensor and an optical system for forming a subject image on the image sensor, and is configured to capture the image formed on the image sensor with an intersection of the optical axis of the optical system and the image sensor as an imaging center. The image sensor is a complementary metal-oxide semiconductor (CMOS) sensor or a charge-coupled device (CCD) sensor.

A panning drive unit 112, a tilting drive unit 113, and a rotation drive unit 114 drive the imaging unit 111 based on a command from a central processing unit (CPU) 115 (described below). The panning drive unit 112 drives the imaging unit 111 for panning. The tilting drive unit 113 drives the imaging unit 111 for tilting. The rotation drive unit 114 rotates a lens unit 207 (described below) constituting the imaging unit 111, around a rotational axis for rotation (described below). In the present exemplary embodiment, the rotational axis for rotation coincides with an imaging direction 208 of the imaging unit 111. The imaging unit 111 may change the imaging direction 208 to the panning, tilting, or rotation direction with manual operation.

A video processing unit 116 processes a video signal captured by the imaging unit 111. The video signal processing performed by the video processing unit 116 includes converting the video signal captured by the imaging unit 111 into digital form, and coding the digital video signal. The digital video signal format may be, for example, the YUV format. The digital video signal coding method may be based on any one of the MPEG4, H.264, MJPEG, and JPEG standards. The video signal having undergone the video signal processing by the video processing unit 116 is once stored in a memory 117 and then output to the client apparatus 130 via a communication control unit 118 and the network 190, under control of the CPU 115 (described below).

The communication control unit 118 applies packetization processing to the coded digital video signal. To output the digital video signal to the network 190, the communication control unit 118 performs packet multiplexing processing based on a predetermined format, under control of the CPU 115. The predetermined format includes the hypertext transfer protocol (HTTP) and the real-time transport protocol (RTP). The communication control unit 118 transmits to the network 190 the digital video signal captured by the imaging unit 111.

The CPU 115 loads a program from the memory 117 and then executes it to control operations of each component included in the imaging apparatus 110. The CPU 115 also controls the panning drive unit 112, the tilting drive unit 113, and the rotation drive unit 114 according to commands received from the client apparatus 130 via the network 190. Based on results of driving the imaging apparatus 110 by the panning drive unit 112, the tilting drive unit 113, and the rotation drive unit 114, the CPU 115 also transmits panning, tilting, and rotation positions of the imaging unit 111 to the client apparatus 130 via the communication control unit 118. The CPU 115 acquires from the imaging unit 111 a viewing angle (angle of view) of the imaging unit 111 and the size of the captured image captured by the imaging unit 111, and transmits them to the client apparatus 130. The size of the image refers to, for example, the length of the diagonal line of the captured image 302.

Figure 2A:
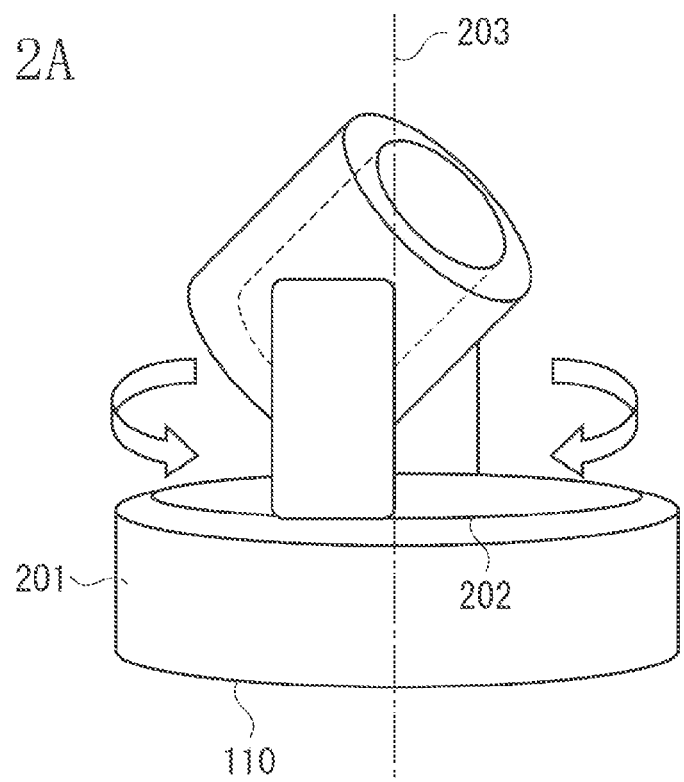
FIGS. 2A and 2B illustrate an imaging apparatus having panning, tilting, and rotation mechanisms.
Figure 2B:
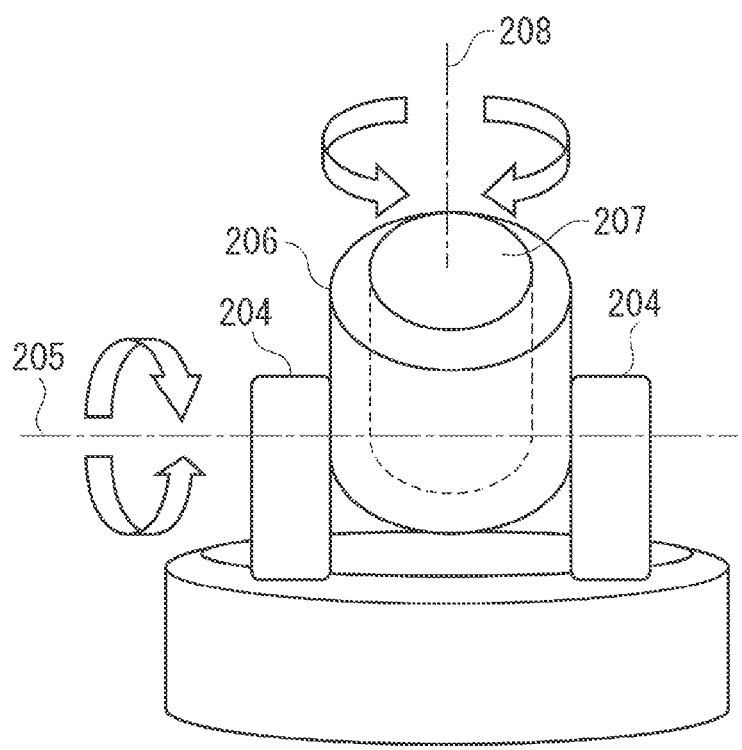

An exemplary imaging apparatus 110 is illustrated in FIGS. 2A and 2B. FIG. 2A is a side view of the imaging apparatus 110. Referring to FIG. 2A, a rotation unit for panning includes a bottom case 201 and a turntable 202, which rotates around the panning rotational axis 203. The panning rotational axis 203 rotates the imaging direction 208 in the panning direction. The panning drive unit 112 includes a stepping motor and is configured to drive the imaging unit 111 for panning by rotating the turntable 202.

FIG. 2B is a front view of the imaging apparatus 110. A rotation unit for tilting includes a lens support 204 and a lens case 206, and is configured to rotate the lens case 206 around a tilting rotational axis 205. The tilting drive unit 113 includes a stepping motor and is configured to drive the imaging unit 111 for tilting by rotating the lens case 206. A rotation unit for rotation includes the lens case 206 and the lens unit 207, which rotates around the rotational axis for rotation. The rotation drive unit 114 includes a stepping motor and is configured to drive the imaging unit 111 for rotation by rotating the lens unit 207.

The client apparatus 130 will be described below with reference to FIG. 1. Under control of a CPU 137, the client apparatus 130 receives the captured image transmitted from the imaging apparatus 110 via a communication control unit 131, stores the captured image in a memory 132, and then transmits it to a display control unit 133.

The display control unit 133 superimposes a panning direction guide for indicating the panning drive direction by the panning drive unit 112 onto the captured image captured by the imaging unit 111. The display control unit 133 also superimposes a tilting direction guide for indicating the tilting drive direction by the tilting drive unit 113 onto the captured image captured by the imaging unit 111. Then, the display control unit 133 superimposes onto the captured image a panning direction guide for indicating the panning drive direction by the panning drive unit 112 and a tilting direction guide for indicating the tilting drive direction by the tilting direction guide 113, and displays the resultant image on a display apparatus 170. Display modes will be described below with reference to FIGS. 3A to 3F. Then, the display control unit 133 performs display control for displaying user interfaces such as operation buttons on the display apparatus 170.

A user interface (UI) control unit 136 receives a command from an input apparatus 150 (described below), and transmits to the imaging apparatus 110 commands for controlling the panning drive unit 112, the tilting drive unit 113, and the rotation drive unit 114 via the communication control unit 131, under control of the CPU 137. The UI control unit 136 includes a panning operation unit 138 for operating the panning drive unit 112, a tilting operation unit 139 for operating the tilting drive unit 113, and a rotation operation unit 140 for operating the rotation drive unit 114.

The input apparatus 150 inputs from the user various commands for operating the imaging apparatus 110. The input apparatus 150 outputs to the UI control unit 136 panning, tilting, and rotation drive commands input by the user. The input apparatus 150 is, for example, a keyboard, mouse, etc. The user operates the operation buttons displayed on the display apparatus 170 (described below) by using the keyboard or mouse to operate the imaging apparatus 110. The input apparatus 150 and the display apparatus 170 may be configured as one apparatus, and commands to the imaging apparatus 110 may be input from a touch panel.

Through display control by the display control unit 133, the display apparatus 170 displays the captured image captured by the imaging apparatus 110 and direction guides indicating the panning and tilting drive directions. Although FIG. 1 illustrates the client apparatus 130 and the display apparatus 170 as independent apparatuses, they may be configured as one apparatus. For example, when using a personal computer (PC) as the client apparatus 130, displaying the captured image and direction guides on the display of the PC enables the PC to serve also as the display apparatus 170.

Figure 3A:
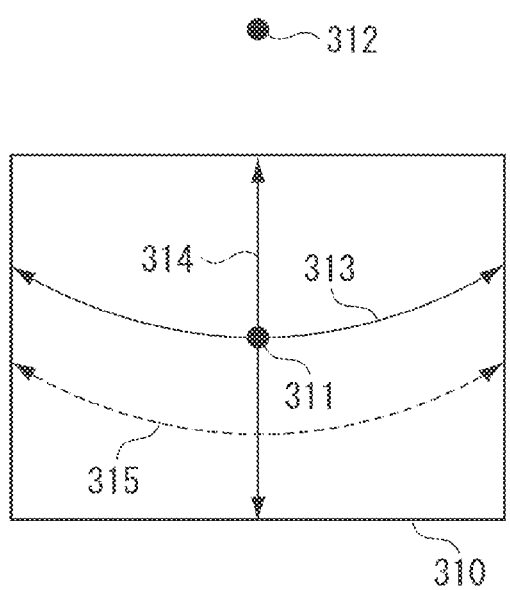
FIGS. 3A to 3F illustrate display images according to the first exemplary embodiment.

Exemplary display images displayed on the display apparatus 170 through display control by the display control unit 133 are illustrated in FIGS. 3A to 3F. FIG. 3A illustrates a state where the imaging direction 208 is close to the perpendicular to the panning rotational axis 203. Referring to FIG. 3A, a display image 310 is displayed on the display apparatus 170 after the display control unit 133 applies display control to the captured image received from the imaging apparatus 110 by the client apparatus 130. An imaging center 311 is an intersection of the optical axis of the optical system for forming a subject image on the image sensor and a plane containing the captured image captured by the imaging unit 111.

A panning rotation center 312 indicates the position of a panning rotation center in the plane of the display image 310. A panning main guide 313 is a panning direction guide for indicating the panning moving direction such that the panning main guide 313 overlaps a moving path to be traced by the imaging center 311 while the imaging unit 111 is driven for panning. A method for setting the panning rotation center 312 and a method for displaying the panning main guide 313 will be described below with reference to FIG. 3E. A tilting main guide 314 is a tilting direction guide for indicating the tilting moving direction such that the tilting main guide 314 overlaps a moving path to be traced by the imaging center 311 while the imaging unit 111 is driven for tilting. A panning sub guide 315 is a panning direction guide which does not pass through the imaging center 311. In the present exemplary embodiment, the panning sub guide 315 is superimposed onto the captured image such that the panning sub guide 315 does not overlap a moving path to be traced by the imaging center 311 while the imaging unit 111 is driven for panning. The panning sub guide 315 is displayed on the outer side of the panning main guide 313 at a suitable interval from the panning rotation center 312. The panning sub guide 315 shows the user the panning drive direction similarly to the panning main guide 313. Thus, the display control unit 133 superimposes onto the captured image the panning direction guides not passing through the imaging center 311 when the imaging unit 111 is driven for panning. A method for displaying the panning sub guide 315 will be described below.

A method for displaying the panning main guide 313 and a method for setting the panning rotation center 312 will be described below with reference to FIG. 3E. Referring to FIG. 3E, the panning rotational axis 203 is used by the imaging unit 111 for panning rotation, and an imaging apparatus position 300 indicates the position of the imaging apparatus 110. Referring to FIG. 3E, a captured image 302 is virtually arranged so as to perpendicularly intersect with the imaging direction 208 of the imaging unit 111, and a vector 301 indicates the direction of the center of the captured image 302. The magnitude of the vector 301 is set up according to the viewing angle of the captured image 302 and the size of the captured image 302.

The display control unit 133 performs display control for the panning main guide 313 and sets up the panning rotation center 312. The display control unit 133 first calculates the magnitude of the vector 301 based on the viewing angle acquired from the imaging apparatus 110 and the size of the captured image 302. The magnitude of the vector 301 is calculated, for example, by formula (1).

$$L = d/\tan\alpha \tag{1}$$

where L denotes the magnitude of the vector 301, 2d denotes the length of a diagonal line of the captured image 302, and 2α denotes the viewing angle of a diagonal line of the captured image 302.

The display control unit 133 also calculates the value of an angle 303 between the panning rotational axis 203 and the vector 301 based on a tilting angle acquired from the imaging apparatus 110. Then, the display control unit 133 derives the length of a panning rotation radius 304 based on the calculated magnitude L of the vector 301 and the value of the angle 303. The length of the panning rotation radius 304 can be calculated by formula (2).

$$r = L \cdot \sin \beta \quad (2)$$

where r denotes the length of the panning rotation radius 304 and β denotes the value of the angle 303.

Based on the thus-obtained panning rotation radius 304, the display control unit 133 calculates the circumference of a circle perpendicularly intersecting with the panning rotational axis 203 as a panning rotational orbit 305. Then, the display control unit 133 projects the panning rotational orbit 305 (viewed from the imaging apparatus position 300) from the imaging apparatus position 300 onto the virtual captured image 302 to display the panning main guide 313.

Then, the display control unit 133 sets up an intersection of a plane containing the captured image 302 and the panning rotational axis 203 as the panning rotation center 312. In the present exemplary embodiment, when the value of the angle 303 is 90 degrees, the panning rotation center 312 is to be set as a point existing above in FIG. 3E, on a straight line passing through the imaging center 311 of the captured image 302 and being parallel to the panning rotational axis 203 on the plane containing the captured image 302. Setting the panning rotation center 312 when the value of the angle 303 is 90 degrees is based not only on the above-mentioned method. When the value of the angle 303 is 90 degrees, the panning rotation center 312 may not to be set on the plane containing the captured image 302.

Displaying the panning main guide 313 and setting the panning rotation center 312 are based not only on the above-mentioned methods. For example, the panning rotation center 312 is set to a point existing above in FIG. 3A in the tilting drive direction, where the distance from the imaging center 311 of the display image 310 is equal to the panning rotation radius 304. An arc around the panning rotation center 312 and having a radius equal to the panning rotation radius 304 may be displayed as the panning main guide 313. Further, the panning main guide 313 may not be displayed as an arc. For example, as illustrated in FIG. 3F, the panning main guide 313 may be displayed as arrows to indicate the panning drive direction. For example, arrows may be drawn to be circumscribed on a curve drawn by projecting the panning rotational orbit 305. Alternatively, arrows may be drawn such that their respective ends are inscribed into a curve drawn by projecting the panning rotational orbit 305. The above-mentioned methods for displaying the panning drive direction are to be considered as examples for indicating the panning drive direction, and displaying the panning drive direction is based not only thereon. In the above-mentioned examples, although the panning main guide 313 is displayed as a part or the whole of a circle having an equal radius, the panning main guide 313 may be drawn as a part or the whole of an ellipse around the imaging center 311.

A method for displaying the panning sub guide 315 will be described below. The panning sub guide 315 can be displayed to be constantly distant from the panning main guide 313. Alternatively, similar to the panning main guide 313, the panning drive direction may be displayed as arrows inscribed or circumscribed with respect to a curve drawn to be constantly distant from the panning main guide 313. Although the panning main guide 313 is drawn by a solid line and the panning sub guide 315 is drawn by a dashed line in FIG. 3A, the panning main guide 313 may be drawn by a dashed line and the panning sub guide 315 may be drawn by a solid line. Displaying the panning sub guide 315 is based not only on the above-mentioned method but also on any other method as long as the method indicates the panning drive direction such that the method does not pass through the imaging center 311 when the imaging unit 111 is driven for panning.

Suppose that, in the state illustrated in FIG. 3A, the user inputs from the input apparatus 150 a command for driving the imaging unit 111 for tilting, the imaging unit 111 is driven for tilting toward the panning rotation center 312 (in the upward direction in FIG. 3A), and the imaging direction 208 comes close to the panning rotational axis 203. A display image 320 displayed in this state will be described below with reference to FIG. 3B. When the imaging direction 208 comes close to the panning rotational axis 203, the imaging center 311 and the panning rotation center 312 come close to each other to reduce the radius of the panning main guide 313, making it difficult for the user to recognize the panning drive direction. However, displaying the panning sub guide 315 on the outer side of the panning main guide 313 enables indicating the panning drive direction with an arc having a larger radius, making it easier for the user to recognize the panning drive direction.

Figure 3B:
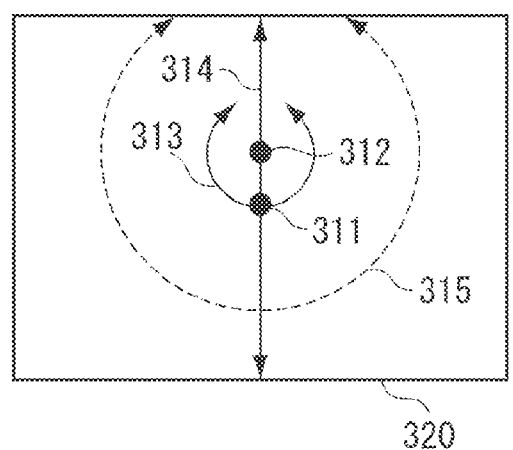
Figure 3C:
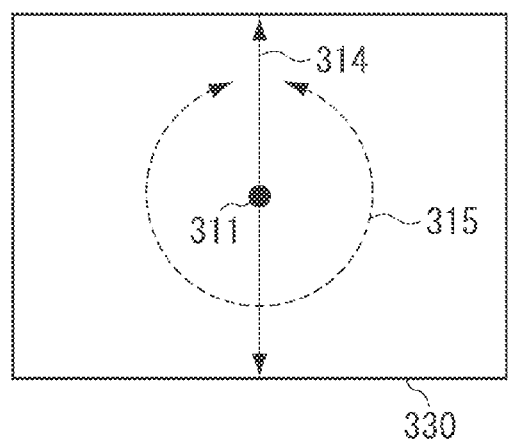

Suppose that, in the state illustrated in FIG. 3B, the imaging unit 111 is further driven for tilting toward the panning rotation center 312, and the imaging center 311 coincides with the panning rotational axis 203. A display image 330 in this state will be described below with reference to FIG. 3C. In this state, since the position of the panning rotation center 312 derived from state values of the imaging apparatus 110 coincides with the imaging center 311, the panning main guide 313 converges to a point and can no longer be displayed. However, the panning sub guide 315 set up to be displayed on the outer side of the panning main guide 313 is kept being displayed without converging to a point, enabling the user to recognize the panning drive direction. Thus, the display control unit 133 provides, together with a captured image, a panning direction guide indicating that changing the imaging direction 208 to the panning direction rotates the captured image around the imaging center 311 when the imaging direction 208 of the imaging unit 111 coincides with the panning rotational axis 203.

Figure 3D:
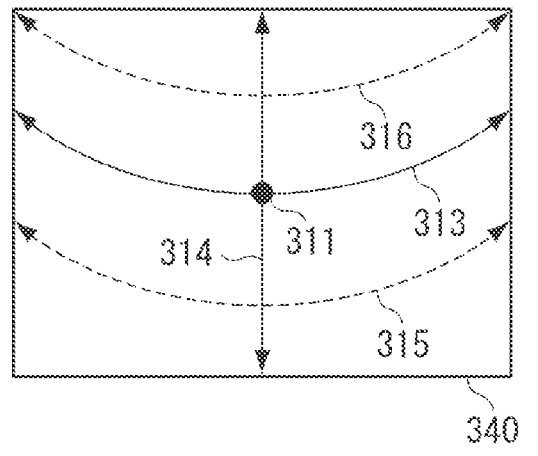
Figure 3E:
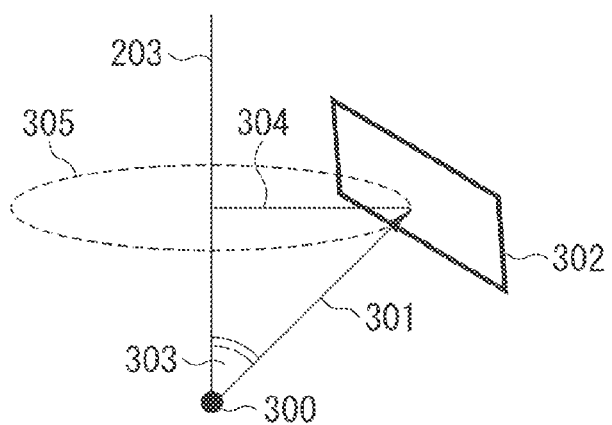
Figure 3F:
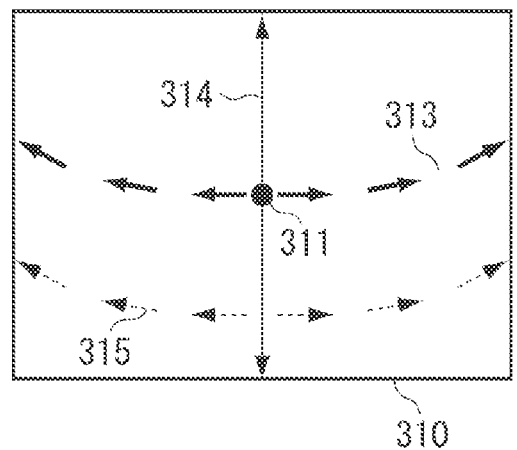

Further, like a display image 340 illustrated in FIG. 3D, the display control unit 133 can display a second panning sub guide 316 on the inner side of the panning main guide 313. The second panning sub guide 316 can show the user in advance how the panning main guide 313 will change when the imaging unit 111 is driven for tilting toward the panning rotation center 312 (in the upward direction in FIG. 3D). Therefore, even if the panning main guide 313 converges to a point and can no longer be displayed as mentioned above, the second panning sub guide 316 can suitably inform the user of the moving direction of the captured image without confusing the user. Thus, the imaging control system or the control apparatus according to the present exemplary embodiment can make it easier for the user to recognize the panning drive direction of the imaging apparatus 110.

Figure 4:
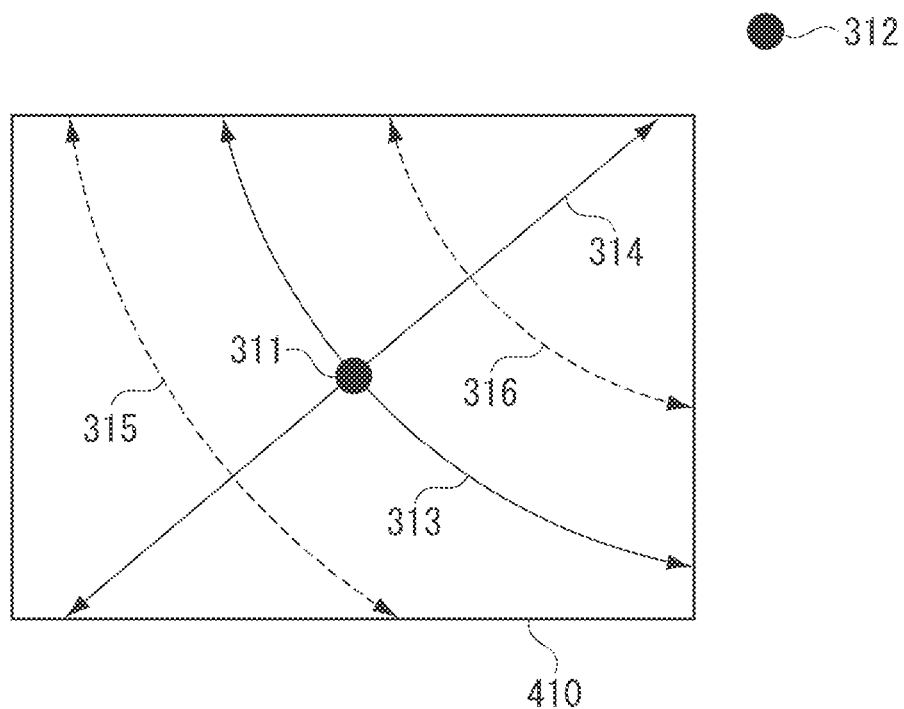
FIG. 4 illustrates a display image produced when an imaging apparatus according to the first exemplary embodiment is driven for rotation.

Suppose that, in the state illustrated in FIG. 3D, the imaging unit 111 is driven for rotation. A display image 410 produced in this state is illustrated in FIG. 4. When the imaging unit 111 is driven for rotation, the display image 340 in FIG. 3D rotates around the imaging center 311. With the rotation of the display image 340, the display control unit 133 rotates the orientation of the panning main guide 313, the tilting main guide 314, and the panning sub guides 315 and 316 around the imaging center 311, and superimposes them onto the captured image. Thus, the display control unit 133 superimposes the panning direction guides and the tilting direction guides on the captured image depending on the amount of rotation drive operation by the rotation drive unit 114.

Thus, the client apparatus 130 can show the user the panning and tilting drive directions when the imaging unit 111 is driven for rotation. Further, even when the panning rotation center 312 coincides with the imaging center 311 and the panning main guide 313 converges to a point and can no longer be displayed, the panning sub guide 315 can show the user the panning drive direction. Then, the panning sub guide 316 can show the user in advance how the panning main guide 313 will change when the imaging unit 111 is driven for tilting toward the panning rotation center 312. When the imaging unit 111 is driven for rotation, the panning and tilting drive directions incline as illustrated in FIG. 4, making it difficult for the user to grasp the panning and tilting drive directions. However, the present exemplary embodiment can show the user the panning and tilting drive directions even when the optical axis of the imaging apparatus 110 comes close to the panning rotational axis 203.

Thus, the panning direction guides such as the panning main guide 313 and the panning sub guides 315 and 316 indicate that changing the imaging direction 208 to the panning direction rotates a predetermined point on the captured image around the panning rotation center 312. Although the panning direction guides indicate a part or the whole of a circle having a constant radius in the above-mentioned examples for convenience, they may indicate a part or the whole of an ellipse around the imaging center 311.

Figure 5:
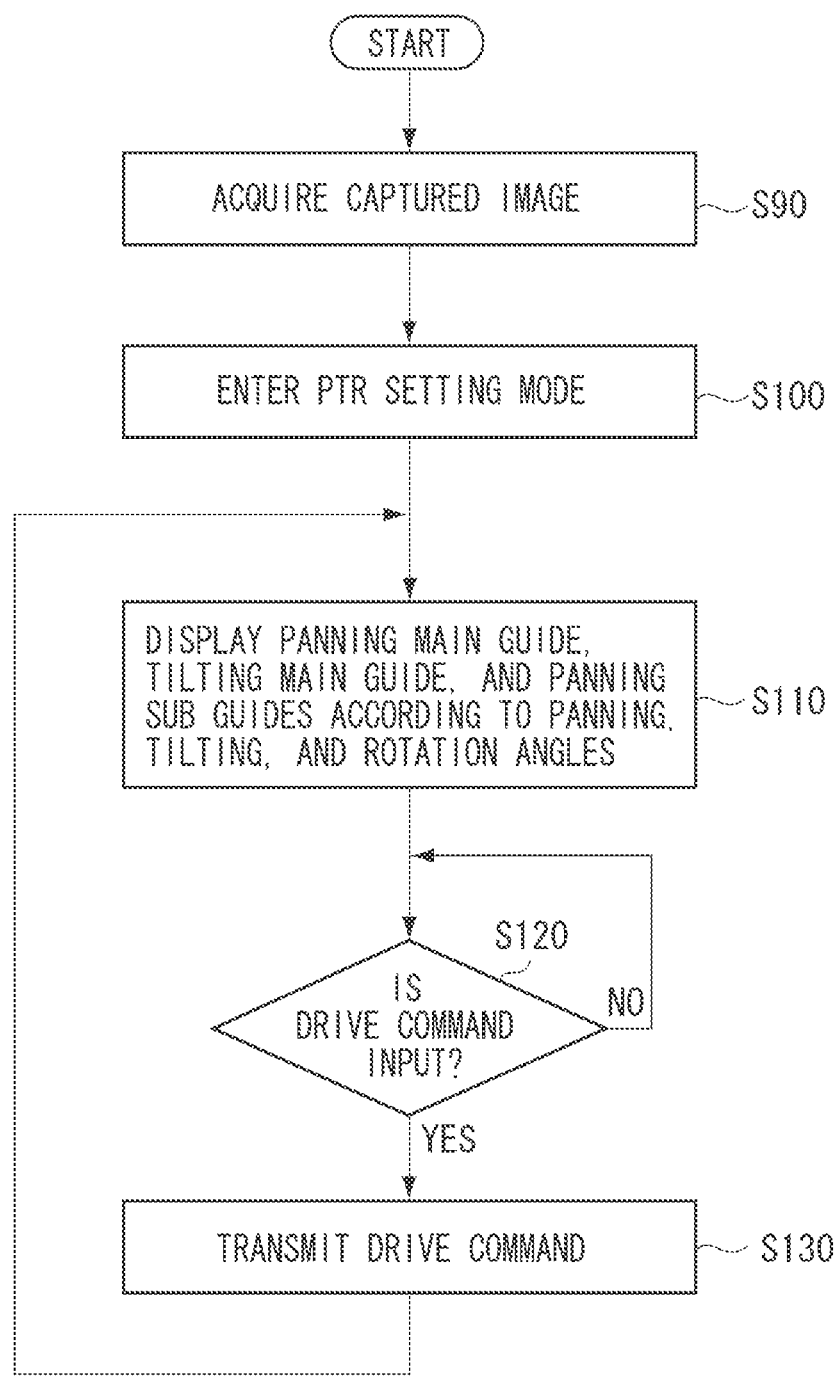
FIG. 5 is a flow chart illustrating operations of a control apparatus according to the first exemplary embodiment.

Operations of the client apparatus 130 according to the present exemplary embodiment will be described below with reference to the flow chart in FIG. 5. The processing of the flow chart in FIG. 5 is implemented by a program for causing the client apparatus 130 to execute the processing in FIG. 5. The client apparatus 130 includes a computer (the CPU 137) for executing a program loaded from the memory 132 included in the client apparatus 130.

In step S90, the communication control unit 131 of the client apparatus 130 acquires the captured image captured by the imaging unit 111. In step S100, the client apparatus 130 enters the panning, tilting, and rotation (PTR) setting mode. The PTR setting mode is a mode which enables the user to set up operations of the panning drive unit 112, the tilting drive unit 113, and the rotation drive unit 114 of the imaging apparatus 110 from the client apparatus 130. More specifically, when the PTR mode is entered, the display control unit 133 displays on the display apparatus 170 the display image 340 and operation buttons for setting panning, tilting, and rotation operations upon reception of a command from the CPU 137. Then, the client apparatus 130 issues a command to the imaging apparatus 110 according to a command input by the user by operating the operation buttons on the input apparatus 150.

In step S110, the client apparatus 130 displays the panning main guide 313, the tilting main guide 314, and the panning sub guides 315 and 316 according to the current panning, tilting, and rotation angles, as illustrated in FIGS. 3A to 3F and 4.

In step S120, the client apparatus 130 determines whether a command for driving the imaging apparatus 110 is input from the input apparatus 150. When a command for driving the imaging apparatus 110 is input from the input apparatus 150 to the client apparatus 130 (YES in step S120), the processing proceeds to step S130. In step S130, the client apparatus 130 transmits to the imaging apparatus 110 a drive command corresponding to an operation input by the user. Then, the processing returns to step S110.

Figure 6:
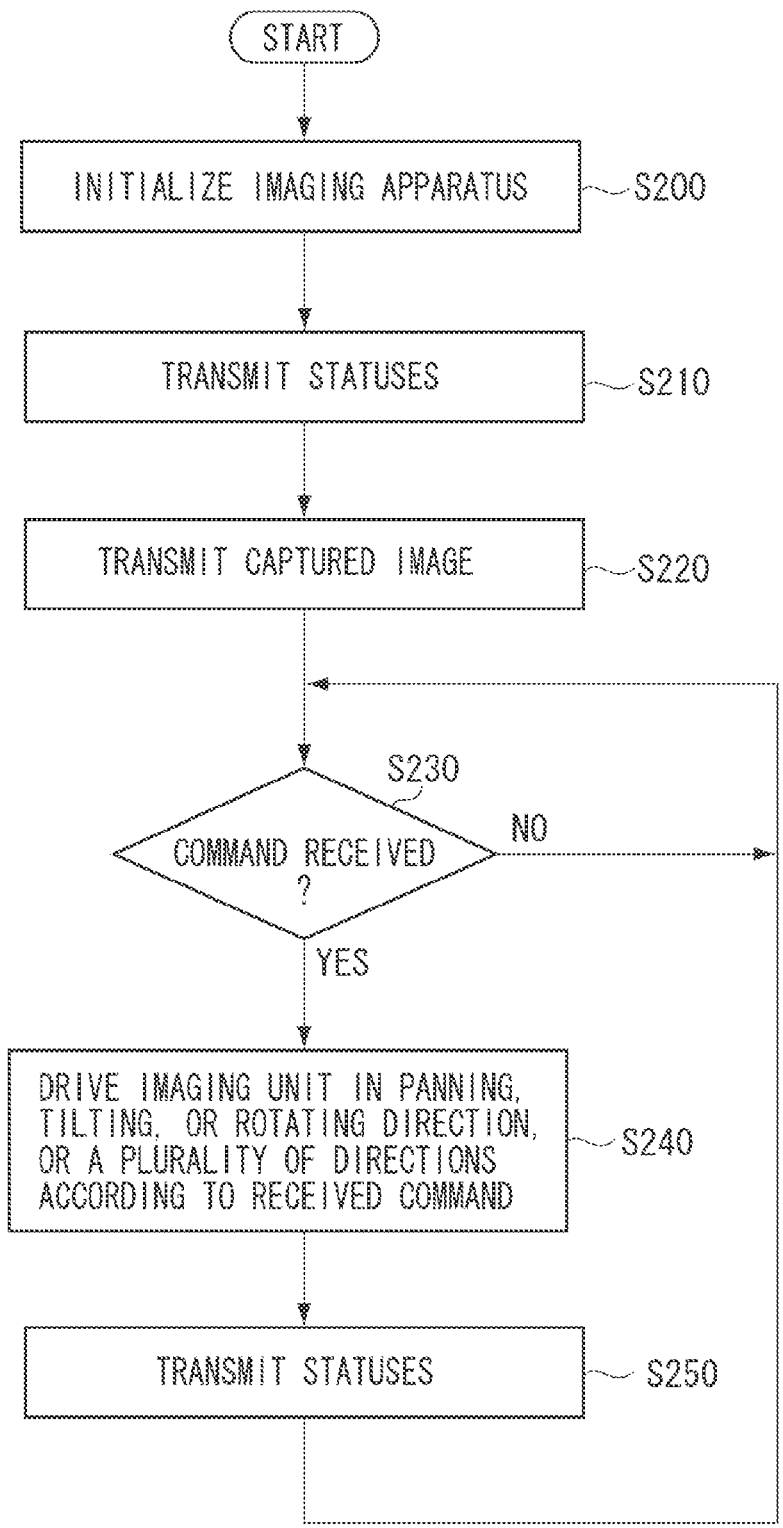
FIG. 6 is a flow chart illustrating operations of the imaging apparatus according to the first exemplary embodiment.

Operations of the imaging apparatus 110 according to the present exemplary embodiment will be described below with reference to the flow chart in FIG. 6. The processing of the flow chart in FIG. 6 is implemented by a program for causing the imaging apparatus 110 to execute the processing illustrated in FIG. 6. The imaging apparatus 110 includes a computer (the CPU 115) for executing a program loaded from the memory 117 included in the imaging apparatus 110.

In step S200, the imaging apparatus 110 initializes the imaging apparatus 110, i.e., the panning drive unit 112, the tilting drive unit 113, and the rotation drive unit 114, as well as the imaging unit 111. Through initialization, the imaging apparatus 110 confirms origin positions of the panning drive unit 112, the tilting drive unit 113, and the rotation drive unit 114, and detects current imaging positions of these units.

In step S210, the imaging apparatus 110 transmits to the client apparatus 130 current positions of the panning drive unit 112, the tilting drive unit 113, and the rotation drive unit 114, as well as the viewing angle of the captured image as a status. Upon completion of initialization, in step S220, the imaging apparatus 110 transmits the captured image to the client apparatus 130. In step S230, the imaging apparatus 110 waits for reception of a command from the client apparatus 130.

When a command is received from the client apparatus 130 (YES in step S230), the processing proceeds to step S240. In step S240, the imaging apparatus 110 drives the imaging unit 111 for panning, tilting, or rotation, or a plurality of drive operations according to the received command. The panning drive unit 112, the tilting drive unit 113, and the rotation drive unit 114 drive the imaging unit 111 for panning, tilting, and rotation, respectively. In step S250, after the imaging unit 111 is driven as specified by the client apparatus 130, the imaging apparatus 110 transmits to the client apparatus 130 current positions of the panning drive unit 112, the tilting drive unit 113, and the rotation drive unit 114, as well as the viewing angle of the captured image as a status. Then, the processing returns to step S230 to wait for command reception.

Although the panning sub guides 315 and 316 are constantly displayed on the outer and inner sides of the panning main guide 313, respectively, the timing of displaying the panning sub guides 315 and 316 is not limited to thereto. The panning sub guides 315 and 316 may be displayed only when the imaging area of the imaging unit 111 falls within a specific range. For example, when the value of the angle 303 between the panning rotational axis 203 used by the panning drive unit 112 to drive the imaging unit 111 for panning and the vector 301 of the imaging unit 111 is equal to or less than a threshold value, the display control unit 133 can superimpose the panning sub guides 315 and 316 onto the captured image. In this case, the vector 301 coincides with the optical axis of the imaging unit 111. Alternatively, when the distance between the imaging center 311 and the panning rotation center 312 illustrated in FIG. 3A is equal to or less than a predetermined value, the panning sub guides 315 and 316 can be displayed.

As mentioned above, the distance between the imaging center 311 and the panning rotation center 312 is determined by the length of the panning rotation radius 304 illustrated in FIG. 3E. The length of the panning rotation radius 304 depends on the viewing angle of the imaging unit 111 and the size of the captured image 302. Therefore, changing the threshold value of the angle 303 according to the viewing angle of the imaging unit 111 and the size of the captured image enables the display control unit 133 to display the panning sub guides 315 and 316 when the distance between the imaging center 311 and the panning rotation center 312 is equal to or less than the predetermined value. Determining whether the imaging area of the imaging unit 111 falls within a specific range is based not only on the above-mentioned method but also on any other method.

Processing is based not only on the above-mentioned modes. The panning sub guide 315 may indicate that changing the imaging direction 208 to the panning direction rotates the captured image around the imaging center 311 when the imaging direction 208 of the imaging unit 111 coincides with the panning rotational axis 203. A case where the imaging direction 208 of the imaging unit 111 coincides with the panning rotational axis 203 is not limited to a case where they actually coincide with each other. For example, such cases include a case where, even when the panning main guide 313 is displayed, the user cannot recognize that changing the imaging direction 208 to the panning direction rotates the captured image since the angle between the imaging direction 208 of the imaging unit 111 and the panning rotational axis 203 is equal to or less than a threshold value. Such cases include a case where the panning main guide 313 cannot be displayed since the angle between the imaging direction 208 of the imaging unit 111 and the panning rotational axis 203 is equal to or less than the threshold value. The threshold value can be arbitrarily set, for example, to 5 degrees.

When the imaging direction 208 of the imaging unit 111 coincides with the panning rotational axis 203, processing is not limited to superimposition of the panning sub guide 315 onto the captured image as illustrated in FIG. 3C, but a part or the whole of a circle may be displayed around the captured image. Thus, it becomes possible to indicate that the captured image will rotate around the imaging center 311.

When the imaging direction 208 of the imaging unit 111 coincides with the panning rotational axis 203, a text message may be displayed on the display screen to notify the user that changing the imaging direction 208 to the panning direction rotates the captured image, instead of displaying the panning sub guide 315 as illustrated in FIG. 3C. In this case, a text message such as "changing the imaging direction to the panning direction rotates the screen" may be displayed together with the captured image. Alternatively, when the imaging direction 208 of the imaging unit 111 coincides with the panning rotational axis 203, a text message may be displayed on the display screen to enable the user to recognize the direction of screen rotation accompanying the panning operation. In this case, a text message such as "panning to the right rotates the screen counterclockwise" or "panning to the left rotates the screen clockwise" may be displayed together with the captured image.

When the imaging direction 208 of the imaging unit 111 coincides with the panning rotational axis 203, an audio message may be generated to notify the user that changing the imaging direction 208 to the panning direction rotates the captured image around the imaging center 311. For example, when the imaging direction 208 of the imaging unit 111 coincides with the panning rotational axis 203, an audio guidance such as "the captured image will rotate" may be provided when panning operation is made. Similar to displaying the above-mentioned text messages, an audio message may notify the user of the direction of screen rotation accompanying the panning operation.

Thus, even after the panning main guide 313 is no longer displayed, the panning sub guide 315 can notify the user of the panning drive direction. Further, when the panning main guide 313 is highly likely to converge to the panning rotation center 312 when the imaging unit 111 is driven for tilting, the panning sub guide 316 may be displayed on the inner side of the moving path of the imaging center 311 (on the side of the panning rotation center 312) to notify the user that continuing the tilting drive operation causes the panning main guide 313 to be hidden by the panning sub guide 316. Then, hiding the panning sub guides 315 and 316 when the imaging area of the imaging unit 111 is not within a specific range enables giving priority to the viewability of the captured image. The user may not only use a threshold value but also display and hide the panning sub guides 315 and 316. In the present exemplary embodiment, displaying the panning and tilting moving directions is based not only on the above-mentioned method.

According to the above-mentioned configuration, the display control unit 133 superimposes onto the captured image a panning direction guide not overlapping a moving path to be traced by the imaging center 311 while the imaging unit 111 is driven for panning. Therefore, the user can recognize the moving direction even when the imaging center 311 overlaps the panning rotation center 312 and the panning main guide 313 is no longer displayed. Further, displaying the panning sub guide 316 on the inner side of the moving path of the imaging center 311 (on the side of the panning rotation center 312) enables the user to recognize how the panning main guide 313 changes before the imaging center 311 overlaps the panning rotation center 312. Thus, the present exemplary embodiment can suitably notify the user of the moving direction of the imaging area. Therefore, the user can recognize the panning drive direction of the imaging apparatus 110 more easily than in a case where only the panning main guide 313 is displayed on a display image.

Although the present exemplary embodiment displays the panning main guide 313 indicating the panning moving direction such that the panning main guide 313 overlaps a moving path to be traced by the imaging center 311, the effect of the present invention can be achieved even by displaying only the panning sub guides 315 and 316 without displaying the panning main guide 313.

A second exemplary embodiment of the present invention will be described below focusing on an imaging control system for superimposing onto the captured image the latitude and meridian lines on a spherical surface virtually set up around the imaging apparatus 110.

A configuration of the imaging control system according to the second exemplary embodiment will be described below. In addition to the panning main guide 313 and the tilting main guide 314, the display control unit 133 of the client apparatus 130 superimposes onto the captured image the latitude and meridian lines on the spherical surface virtually set up around the imaging apparatus 110. Other elements are similar to those of the imaging control system according to the first exemplary embodiment illustrated in FIG. 1, and duplicated explanation will be omitted. Elements similar to those in the first exemplary embodiment illustrated in FIG. 1 are assigned the same reference numerals.

Figure 7A:
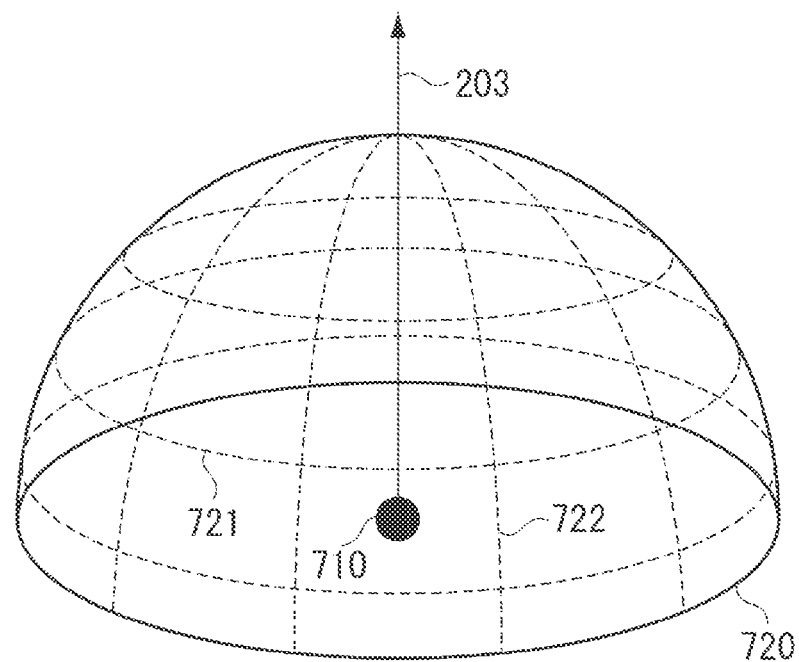
FIGS. 7A and 7B illustrate a virtual spherical surface around the imaging apparatus.

Display images displayed on the display apparatus 170 through display control by the display control unit 133 will be described below with reference to FIGS. 7A, 7B, 8A, and 8B. FIG. 7A illustrates a virtual spherical surface virtually set up around the imaging apparatus 110. Referring to FIG. 7A, an imaging apparatus position 710 indicates a position at which the imaging apparatus 110 is installed. The panning rotational axis 203 is used to drive the imaging unit 111 for panning. A spherical surface 720 is virtually set up around the imaging apparatus 110. The spherical surface 720 is provided with latitude lines 721 and meridian lines 722 at predetermined positions thereon. In the present exemplary embodiment, the latitude lines 721 are set up at fixed intervals from the equatorial plane around the imaging apparatus position 710. The meridian lines 722 are set up at fixed intervals from a predetermined reference meridian line around the imaging apparatus position 710. Setting the latitude lines 721 and the meridian lines 722 is based not only on the above-mentioned method.

Exemplary display images displayed on the display apparatus 170 when the imaging apparatus 110 captures an image at the imaging apparatus position 710 will be described below with reference to FIGS. 8A and 8B. The imaging apparatus 110 transmits the captured image captured thereby to the client apparatus 130. Then, the display control unit 133 superimposes as panning direction guides the latitude lines 721 onto the captured image arranged on the virtual spherical surface 720. In the present exemplary embodiment, the display control unit 133 superimposes a panning main guide 813, the tilting main guide 814, and the meridian lines 722 onto the captured image, and then outputs the resultant image to the display apparatus 170.

Figure 8A:
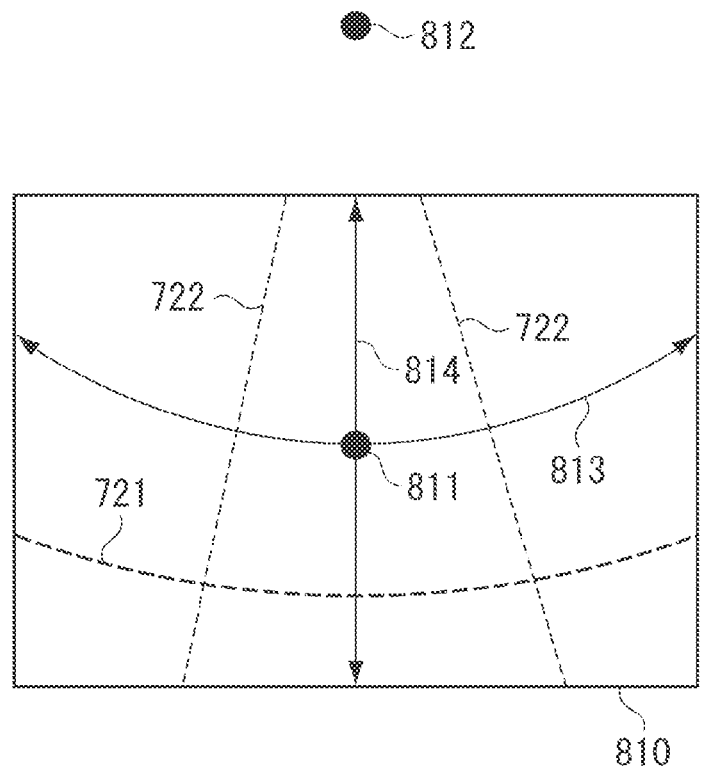
FIGS. 8A and 8B illustrate display images according to the second exemplary embodiment.
Figure 8B:
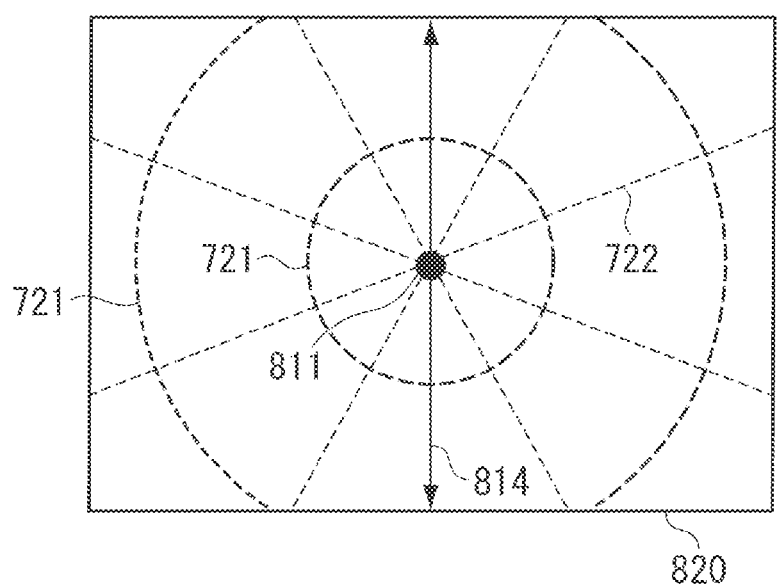
Figure 9A:
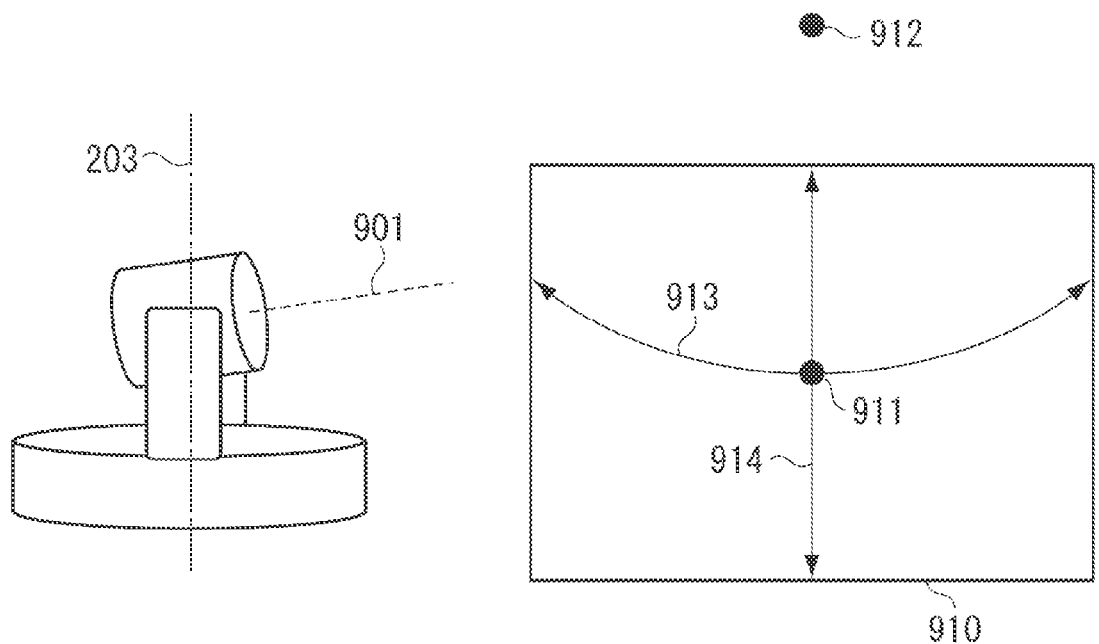
FIGS. 9A and 9B illustrate an exemplary conventional imaging control system.
Figure 9B:
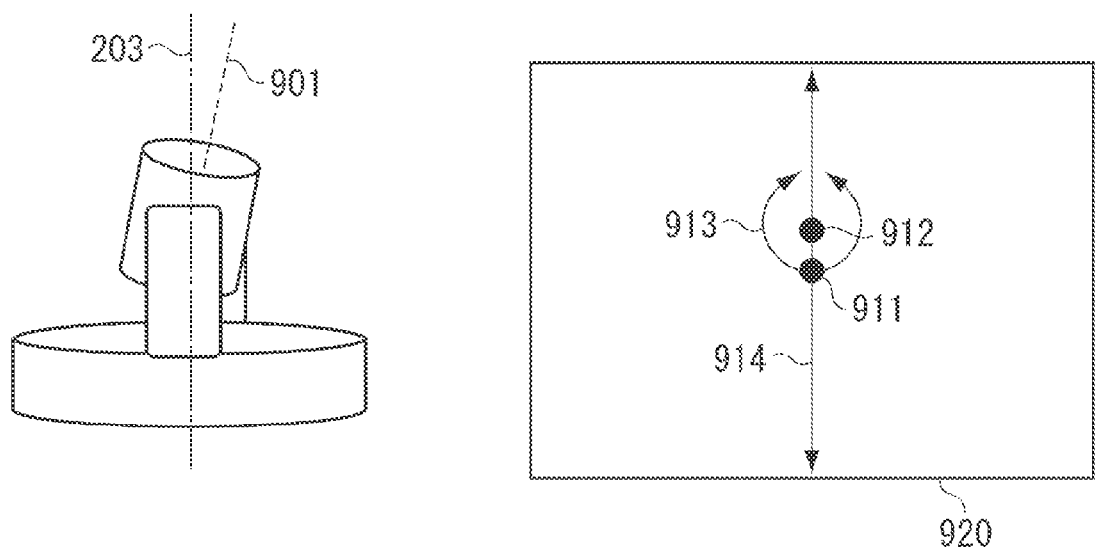

Referring to FIG. 8A, a display image 810 is displayed on the display apparatus 170. An imaging center 811 is an intersection of the optical axis of the optical system for forming a subject image on the image sensor and a plane containing the captured image 810 captured by the imaging unit 111. A panning rotation center 812 denotes the position of a panning rotation center in a plane containing the captured image 810.

The panning main guide 813 is a panning direction guide for indicating the panning moving direction such that the panning main guide 813 overlaps a moving path to be traced by the imaging center 811 while the imaging unit 111 is driven for panning. The tilting main guide 814 passes through the imaging center 811 to indicate the tilting drive direction. The latitude lines 721 and the meridian lines 722 are set up on the spherical surface 720. In the present exemplary embodiment, the panning main guide 813 and the tilting main guide 814 are superimposed onto the captured image 810, and then the latitude lines 721 and the meridian lines 722 are superimposed thereon to auxiliarily indicate the panning and tilting drive directions. The present exemplary embodiment controls display positions of the latitude lines 721 and the meridian lines 722 by using setting values of the latitude lines 721 and the meridian lines 722 set up on the spherical surface 720, and the imaging position of the imaging apparatus 110.

Figure 7B:
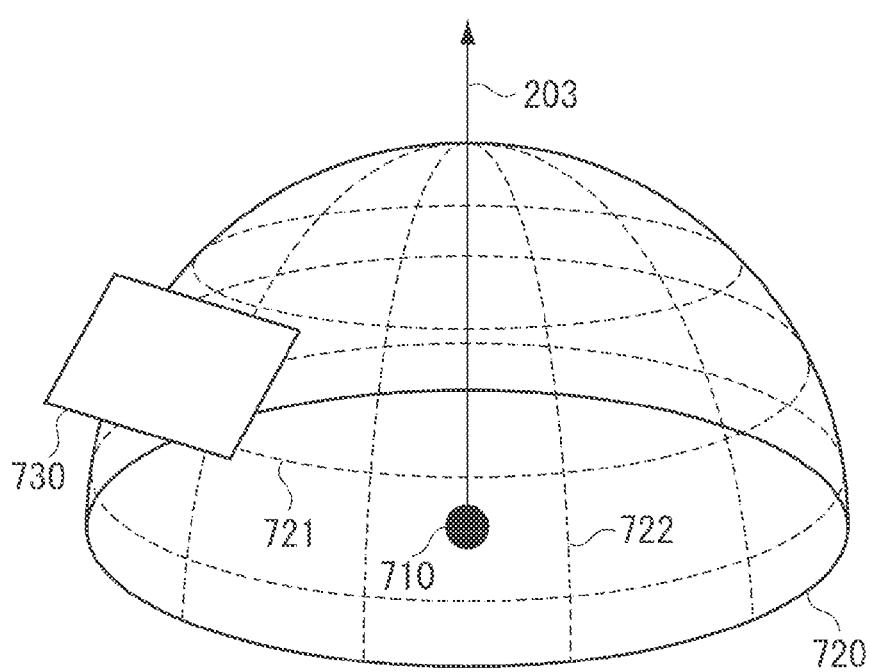

A method for displaying the panning main guide 813 is similar to the relevant method in the first exemplary embodiment illustrated in FIG. 3E, and duplicated explanation will be omitted. A method for displaying the latitude lines 721 and the meridian lines 722 will be described below. Based on imaging position information (panning angle, tilting angle, amount of rotation, etc.), the viewing angle, and the image size received from the imaging apparatus 110, the display control unit 133 of the client apparatus 130 sets up a virtual display image 730 on a virtual spherical surface 720, as illustrated in FIG. 7B. Then, the display control unit 133 projects preset latitude lines 721 and meridian lines 722 onto the display image 730 from the imaging apparatus position 710. Thus, the latitude lines 721 and the meridian lines 722 projected onto the display image 730 are displayed as the latitude lines 721 and the meridian lines 722 on the display image 810.

The above-mentioned method is to be considered as an example, and displaying the latitude lines 721 and the meridian lines 722 is based not only thereon. Although the latitude lines 721 and the meridian lines 722 are drawn by dashed lines in FIG. 8A, they may be drawn by solid lines or arrows. Alternatively, the latitude lines 721, the meridian lines 722, the panning main guide 813, and the tilting main guide 814 may be displayed in different colors for distinction.

Suppose that, in the state illustrated in FIG. 8A, the imaging unit 111 is driven for tilting and the imaging direction 208 of the imaging unit 111 coincides with the panning rotational axis 203. A display image 820 in this state will be described below with reference to FIG. 8B. In this state, similar to the first exemplary embodiment, the panning main guide 813 converges to a point and can no longer be displayed. However, the latitude lines 721 set up on the spherical surface 720 auxiliarily indicates the panning drive direction, enabling the user to recognize the panning drive direction. Further, the latitude lines 721 enable the user to confirm in advance how the panning main guide 813 will change when the imaging unit 111 is driven for panning. Thus, the latitude lines 721 in the present exemplary embodiment play the roles of the panning sub guides 315 and 316 in the first exemplary embodiment.

Although the above-mentioned latitude lines 721 and the meridian lines 722 may be constantly displayed similar to the first exemplary embodiment, displaying these lines is based not only on the above-mentioned method. The latitude lines 721 and the meridian lines 722 may be displayed only when the imaging direction 208 falls within a specific range specified by a separately set threshold value, or set up to be displayed or hidden by the user. Further, the latitude lines 721 and meridian lines 722 may be set to variable positions on the spherical surface 720.

When the imaging unit 111 is subsequently driven for rotation, the display image 810 in FIG. 8A rotates around the imaging center 811 similar to the first exemplary embodiment. With the rotation of the captured image 810, the display control unit 133 rotates the orientation of the panning main guide 813 and the tilting main guide 814 around the imaging center 811. Then, the display control unit 133 newly sets up the display image 730 on the spherical surface 720 depending on the amount of rotation drive operation by the rotation drive unit 114. Then, the display control unit 133 projects the latitude lines 721 and the meridian lines 722 after rotation onto the display image 730, and displays the projected latitude lines 721 and the meridian lines 722 on the display image 730 after rotation. Alternatively, together with the panning main guide 813 and the tilting main guide 814, the latitude lines 721 and the meridian lines 722 may be rotated around the imaging center 811 of the display image 810.

Thus, the client apparatus 130 can show the user the panning and tilting drive directions when the imaging unit 111 is driven for rotation. Further, even when the panning rotation center 812 coincides with the imaging center 811 and the panning main guide 813 converges to a point and can no longer be displayed, the latitude lines 721 can show the user the panning drive direction. Then, the latitude lines 721 can show the user in advance how the panning main guide 813 will change when the imaging unit 111 is driven for tilting toward the panning rotation center 812 (in the upward direction in FIG. 8A).

Operations of the client apparatus 130 and the imaging apparatus 110 in the imaging control system according to the present exemplary embodiment are similar to those in the first exemplary embodiment illustrated in FIGS. 5 and 6, and duplicated explanation will be omitted.

With the above-mentioned configuration, the latitude lines 721 are set up on the virtual spherical surface 720 set up around the imaging apparatus 110, and the latitude lines 721 are superimposed onto the display image 810. Therefore, even when the imaging center 811 overlaps the panning rotation center 812 and the panning main guide 813 is no longer displayed, the latitude lines 721 enable the user to recognize the moving direction. The latitude lines 721 also enable the user to recognize how the panning main guide 813 will change before the imaging center 811 overlaps the panning rotation center 812. Thus, the present exemplary embodiment can suitable notify the user of the moving direction of the imaging area. Therefore, the user can recognize the panning drive direction of the imaging apparatus 110 more easily than the case where only the panning main guide 813 is displayed on the display image 810.

Although the present exemplary embodiment displays the panning main guide 813 indicating the panning moving direction such that the panning main guide 813 overlaps a moving path to be traced by the imaging center 811, the effect of the present invention can be achieved even by displaying only the latitude lines 721 without displaying the panning main guide 813.

A third exemplary embodiment of the present invention will be described below based on a case where an icon is displayed on the panning main guide 313 or the panning sub guide 315. This icon is used to input a command for changing the imaging direction 208 to the panning direction.

Figure 10:
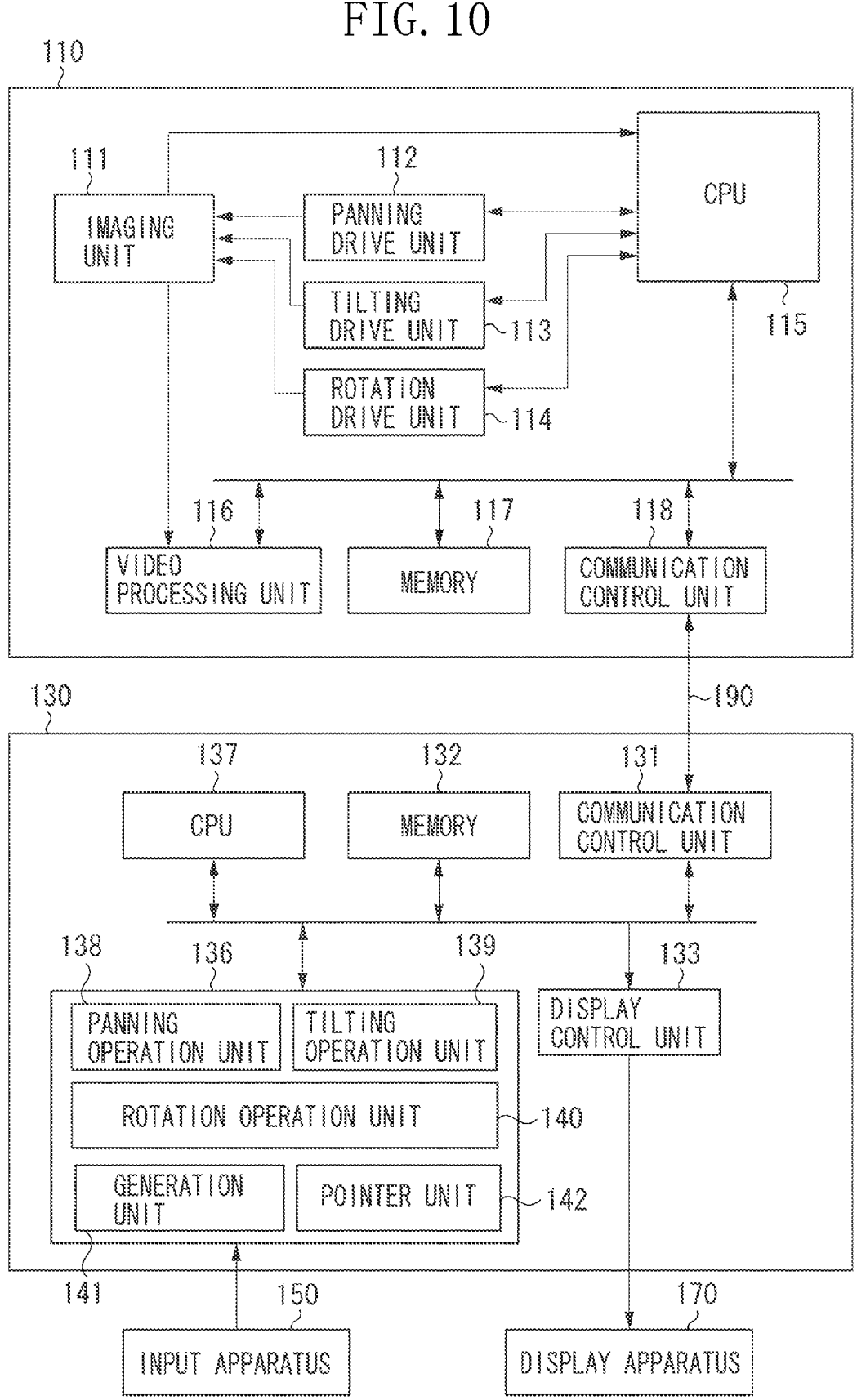
FIG. 10 is a block diagram illustrating an imaging control system according to third and fourth exemplary embodiments of the present invention.

A configuration of the imaging control system according to the present exemplary embodiment is illustrated in FIG. 10. Elements similar to those in the first exemplary embodiment illustrated in FIG. 1 are assigned the same reference numerals, and duplicated explanation will be omitted.

In the present exemplary embodiment, the display control unit 133 of the client apparatus 130 superimposes the above-mentioned icon for inputting a command to the panning operation unit 138 onto a position indicating the panning drive direction on the captured image captured by the imaging unit 111. Lines indicating the panning drive direction refer, for example, to the panning main guide 313 and the panning sub guide 315 illustrated in FIGS. 3A to 3F. In the present exemplary embodiment, the panning sub guide 315 indicates that a point existing on a straight line passing through the panning rotation center 312 and the imaging center 311, where the distance thereof from the panning rotation center 312 is longer than the distance from the panning rotation center 312 to the imaging center 311, will rotate around the panning rotation center 312. In this case, the panning main guide 313 or the panning sub guide 315 does not need to be actually superimposed onto the captured image. The icon is preferably superimposed onto a position where the panning main guide 313 or the panning sub guide 315 should be superimposed.

In the present exemplary embodiment, the user interface control unit 136 includes a generation unit 141 for generating panning operation icons (hereinafter referred to as panning operation buttons) for inputting commands to the panning operation unit 138, and tilting operation icons (hereinafter referred to as tilting operation buttons) for inputting commands to the tilting operation unit 139. The CPU 137 loads an icon display program from the memory 132 and executes it to control the generation unit 141 to generate these icons. Then, the UI control unit 136 further includes a pointer unit 142 for instructing the display control unit 133 to display a pointer on the display apparatus 170, according to a command from the input apparatus 150 (described below) such as a mouse.

When the UI control unit 136 detects that the user clicks the mouse on a panning operation button displayed on the display apparatus 170, the panning operation unit 138 transmits a relevant command for controlling the panning drive unit 112 to the imaging apparatus 110. Then, when the UI control unit 136 detects that the user clicks the mouse on a tilting operation button displayed on the display apparatus 170, the tilting operation unit 139 transmits a relevant command for controlling the tilting drive unit 113 to the imaging apparatus 110. The user clicks on each operation button by using the input apparatus 150. The operation of each operation button is not limited to mouse operation using the pointer. The user may operate each operation button by touching it on a touch panel. Operating the operation buttons is based not only on the above-mentioned method but also on any other method as long as the user can input commands to the panning operation unit 138 by using the operation buttons. The panning and tilting operation buttons are superimposed onto positions indicating the panning and tilting drive directions, respectively, on the captured image. Displaying these operation buttons in this way enables the user to perform panning and tilting drive operations in a more intuitive way.

Figure 11A:
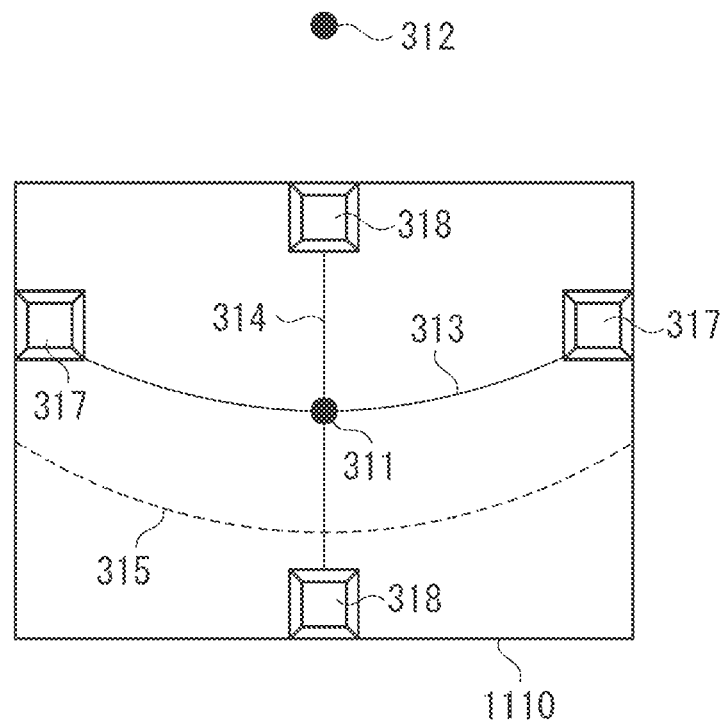
FIGS. 11A to 11D illustrate display images according the third exemplary embodiment of the present invention.

FIGS. 11A to 11D illustrate exemplary display images displayed on the display apparatus 170 through display control by the display control unit 133. FIG. 11A illustrates a display image 1110 produced when the imaging direction 208 is close to the perpendicular to the panning rotational axis 203. Referring to FIG. 11A, the display image 1110 is displayed on the display apparatus 170 after the display control unit 133 applies display control to the captured image received from the imaging apparatus 110 by the client apparatus 130.

The display control unit 133 displays panning operation buttons 317 and tilting operation buttons 318 on the display image 1110. The panning operation buttons 317 are icons used by the user to drive the imaging unit 111 in the panning direction. In the state illustrated in FIG. 11A, the panning operation buttons 317 are displayed at both ends of the panning main guide 313. The tilting operation buttons 318 are icons used by the user to drive the imaging unit 111 in the tilting direction. In the state illustrated in FIG. 11A, the tilting operation buttons 318 are displayed at both ends of the tilting direction guide 314. Of the two panning operation buttons 317, the right-hand side panning operation button 317 is an icon for instructing the panning drive operation in the rightward direction, and the left-hand side panning operation button 317 is an icon for instructing the panning drive operation in the leftward direction. Of the two tilting operation buttons 318, the top tilting operation button 318 is an icon for instructing the tilting drive operation in the upward direction, and the bottom tilting operation button 318 is an icon for instructing the tilting drive operation in the downward direction. Displaying the panning operation buttons 317 on the panning direction guide 313 and the tilting operation buttons 318 on the tilting direction guide 314 enables the user to recognize the drive direction and perform panning and tilting drive operations in a more intuitive way.

Suppose that, in the state illustrated in FIG. 11A, the user instructs from the input apparatus 150 to drive the imaging unit 111 for tilting, the imaging unit 111 is driven for tilting toward the panning rotation center 312 (in the upward direction in FIG. 11A), and the imaging direction 208 comes close to the panning rotational axis 203. A display image 1120 in this state will be described below with reference to FIG. 11B.

When the imaging direction 208 comes close to the panning rotational axis 203, the one panning operation button 317 displayed at one end of the panning main guide 313 overlaps the other panning operation button 317 displayed at the other end of the panning main guide 313. However, when display positions of the panning operation buttons 317 are changed to both ends of the panning sub guide 315, the one panning operation button 317 does not overlap the other panning operation button 317. Specifically, when an angle between the panning rotational axis 203 and the optical axis of the imaging unit 111 is greater than a predetermined threshold value, the display control unit 133 displays the panning operation buttons 317 on the panning main guide 313. When the angle between the panning rotational axis 203 and the optical axis of the imaging unit 111 becomes equal to or less than the predetermined threshold value, the display control unit 133 changes display positions of the panning operation buttons 317. A method for setting the threshold value will be described below. Thus, the display control unit 133 superimposes the panning operation buttons 317 onto positions where the distance from the panning rotation center 312 to the panning operation buttons 317 is longer than the distance from the panning rotation center 312 to the imaging center 311 on the captured image.

A method for determining the threshold value will be described below. For example, the value of the angle 303 with which the distance from the panning rotation center 312 to the imaging center 311 is a quarter of the length of the tilting direction guide 314 displayed on the display image 1110 can be set as the threshold value. Specifically, when a circle around the panning rotation center 312 and having a radius equal to the distance between the imaging center 311 and the panning rotation center 312 is entirely contained in the display image 1110, display positions of the panning operation buttons 317 may be changed.

Referring to FIG. 3E, when the panning rotation center 312 is an intersection of a plane containing the captured image 302 and the panning rotational axis 203, a distance x between the imaging center 311 and the panning rotation center 312 is represented by formula (3).

$$x = L \cdot \tan \beta \quad (3)$$

where L denotes the magnitude of the vector 301 and $\beta$ denotes the value of the angle 303.

Therefore, an angle $\beta$ with which the value of $L \cdot \tan \beta$ is smaller than a quarter of the length of the tilting direction guide 314 displayed on the display image 1110 can be set as the threshold value of the angle 303. Setting the threshold value is based not only on the above-mentioned method but may be based on other methods. For example, an angle $\beta$ with which the distance x is equal to or less than a total sum of a quarter of the length of the tilting direction guide 314 displayed on the display image 1110 and a distance between the panning main guide 313 and the panning sub guide 315 displayed thereon can be set as the threshold value of the angle 303.

The above-mentioned method can prevent the one panning operation button 317 displayed at one end of the panning direction guide 313 from overlapping the other panning operation button 317 displayed at the other end of the panning direction guide 313.

Figure 11B:
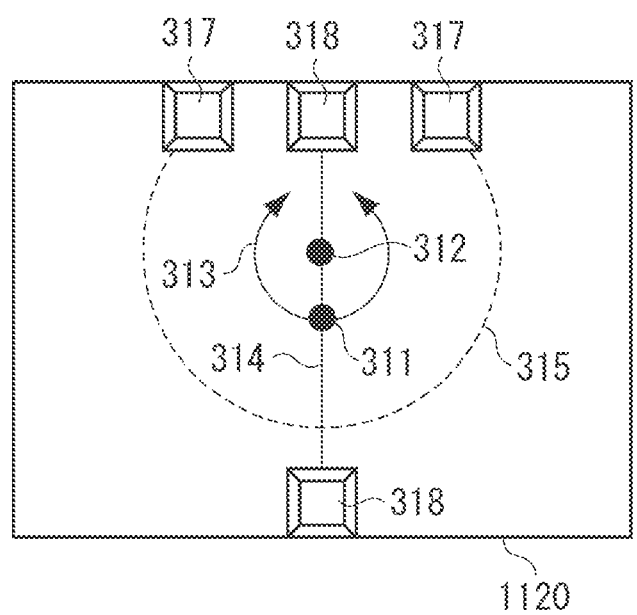
Figure 11C:
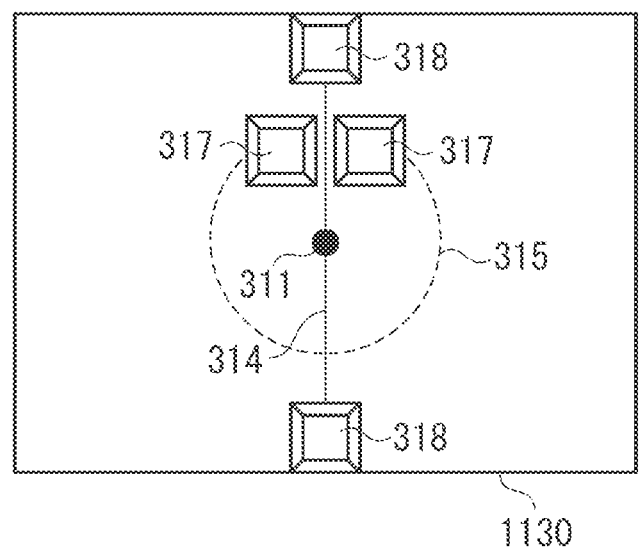

Suppose that, in the state illustrated in FIG. 11B, the imaging unit 111 is further driven for tilting toward the panning rotation center 312, and the imaging center 311 coincides with the panning rotational axis 203. A display image 1130 in this state will be described below with reference to FIG. 11C. In this state, since the position of the panning rotation center 312 derived from state values of the imaging apparatus 110 coincides with the imaging center 311, the panning main guide 313 converges to a point and can no longer be displayed. However, the panning sub guide 315 set up to be displayed on the outer side of the panning main guide 313 is kept being displayed without converging to a point, enabling the user to recognize the panning drive direction. When the imaging center 311 coincides with the panning rotational axis 203, the panning operation buttons 317 set to be displayed at both ends of the panning main guide 313 are no longer displayed on the display image 1130. However, displaying the panning operation buttons 317 at both ends of the panning sub guide 315 prevents the panning operation buttons 317 from being hidden as the imaging unit 111 is driven for tilting. Thus, the display control unit 133 displays the panning operation buttons 317 on the panning direction guide 315 indicating that changing the imaging direction 208 to the panning direction rotates the captured image around the imaging center 311.

Figure 11D:
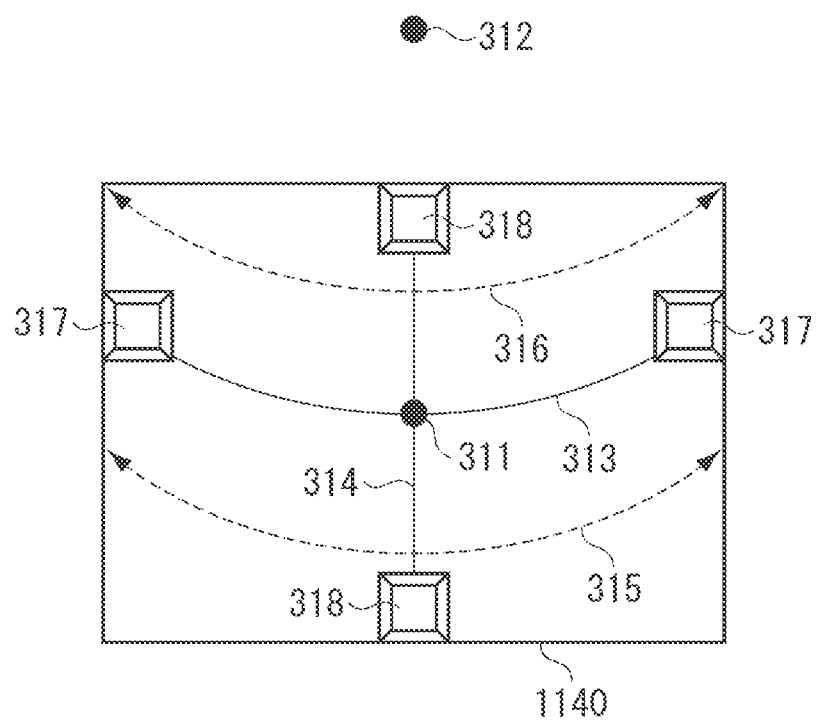

In the present exemplary embodiment, with the rotation of a display image 1140, the display control unit 133 rotates display positions of the panning operation buttons 317 and the tilting operation buttons 318 around the imaging center 311 and then superimposes these operation buttons onto the captured image, as illustrated in FIG. 11D. Specifically, the panning operation buttons 317 are displayed at both ends of the panning direction guide 313 on the rotated captured image 410 illustrated in FIG. 4. Further, the tilting operation buttons 318 are displayed at both ends of the tilting direction guide 314 in the rotated captured image 410 illustrated in FIG. 4. Thus, the client apparatus 130 can display the panning operation buttons 317 and the tilting operation buttons 318 in the panning and tilting directions, respectively, on the captured image produced when the imaging unit 111 is driven for rotation. Further, even when the panning rotation center 312 coincides with the imaging center 311, and the panning main guide 313 converges to a point and can no longer be displayed, the panning sub guide 315 can show the user the panning drive direction. Further, even when the panning rotation center 312 coincides with the imaging center 311, and the panning main guide 313 converges to a point and can no longer be displayed, displaying the panning operation buttons 317 on the panning sub guide 315 enables the user to use the panning operation buttons 317.

Operations of the client apparatus 130 and the imaging apparatus 110 in the imaging control system according to the present exemplary embodiment will be described below. In the present exemplary embodiment, in step S110 illustrated in FIG. 5, the client apparatus 130 displays the panning operation buttons 317 on the panning main guide 313 or the panning sub guides 315 and 316 as mentioned above. Other operations of the client apparatus 130 and the imaging apparatus 110 according to the present exemplary embodiment are similar to those in the first exemplary embodiment illustrated in FIGS. 5 and 6, and duplicated explanation will be omitted.

According to the above-mentioned configuration, the display control unit 133 superimposes the panning operation buttons 317 onto a panning direction guide not overlapping a moving path to be traced by the imaging center 311 while the imaging unit 111 is driven for panning. Thus, the imaging control system according to the present exemplary embodiment can suitably display the panning operation icons even when the optical axis of the imaging apparatus 110 comes close to the panning rotational axis 203. Therefore, even when the imaging center 311 overlaps the panning rotation center 312 and the panning main guide 313 is no longer displayed, the user can drive the imaging unit 111 for panning by using the panning operation buttons 317.

Although, in the present exemplary embodiment, the display control unit 133 changes display positions of the panning operation buttons 317 when the value of the angle 303 between the panning rotational axis 203 and the optical axis of the imaging unit 111 is equal to or less than a predetermined threshold value, the display positions of the panning operation buttons 317 may remain unchanged. Specifically, the panning operation buttons 317 may be displayed on the panning sub guide 315 illustrated in FIGS. 11A to 11D regardless of the value of the angle 303.

Although the present exemplary embodiment displays the panning main guide 313 and the panning sub guides 315 and 316, only the panning operation buttons 317 may be displayed without displaying the panning main guide 313 and the panning sub guides 315 and 316. When only the panning operation buttons 317 are displayed, some arrangements may be made to make it easier for the user to recognize the panning drive direction. Specifically, arrows may be drawn on the panning operation buttons 317 to indicate the panning drive direction or triangular panning operation buttons 317 may be displayed to indicate the panning drive direction with their apexes. Thus, the user can recognize the panning drive direction in a display image and perform a panning drive operation in an intuitive way.

A fourth exemplary embodiment of the present invention will be described below. The present exemplary embodiment displays panning operation buttons at predetermined positions which are symmetrical with respect to a straight line passing through an imaging center and indicating the tilting direction on a display image.

An imaging control system according to the fourth exemplary embodiment is implemented with elements similar to those of the imaging control system according to the third exemplary embodiment illustrated in FIG. 10, and duplicated explanation will be omitted. Elements similar to those in the first exemplary embodiment illustrated in FIG. 10 are assigned the same reference numerals.

Figure 12A:
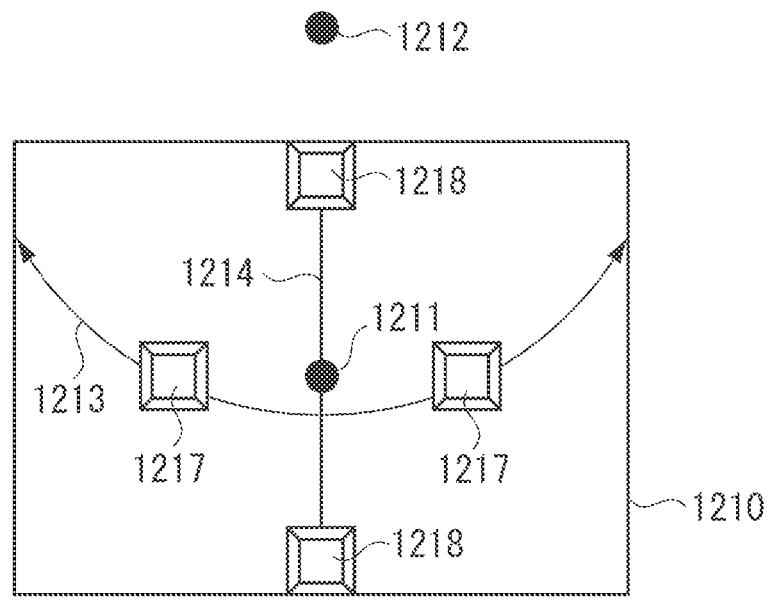
FIGS. 12A to 12C illustrate display images according to the fourth exemplary embodiment of the present invention.

In the fourth exemplary embodiment, a display image 1210 displayed on the display apparatus 170 through display control by the display control unit 133 will be described below with reference to FIGS. 12A to 12C. FIG. 12A illustrates the display image 1210 produced when the imaging direction 208 is close to the perpendicular to the panning rotational axis 203. An imaging center 1211 is an intersection of the optical axis of the optical system for forming a subject image on the image sensor and a plane containing the captured image captured by the imaging unit 111. A panning rotation center 1212 indicates the position of a panning rotation center in a plane containing the display image 1210. A method for setting the panning rotation center 1212 is similar to the relevant method in the first exemplary embodiment illustrated in FIG. 3E, and duplicated explanation will be omitted.

Figure 12B:
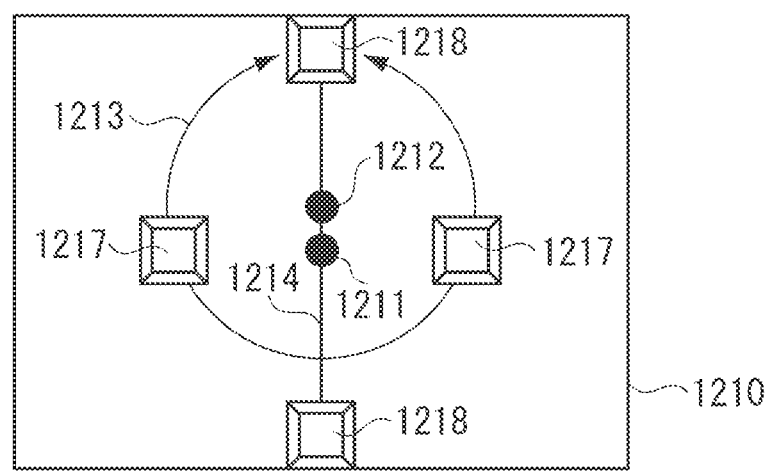
Figure 12C:
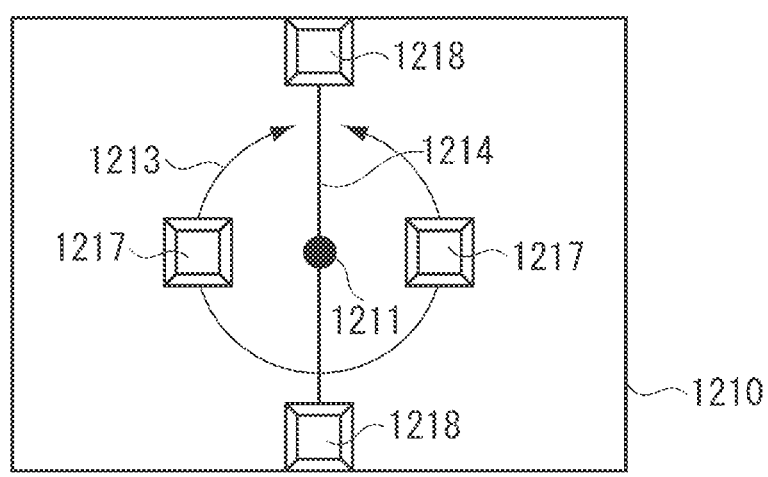

Referring to FIGS. 12A to 12C, a panning main guide 1213 is a panning direction guide for indicating the panning direction on the display image 1210. The panning main guide 1213 is displayed as a circle or arc around the panning rotation center 1212 passing through panning operation buttons 1217 or as a straight line passing therethrough. In the present exemplary embodiment, the panning main guide 1213 is superimposed onto the captured image such that the panning main guide 1213 does not pass through the imaging center 1211 and the distance from the panning rotation center 1212 to the panning main guide 1213 is longer than the distance from the panning rotation center 1212 to the imaging center 1211. In the present exemplary embodiment, the panning main guide 1213 indicates that a predetermined point existing on a straight line passing through the panning rotation center 1212 and the imaging center 1211, where the distance from the panning rotation center 1212 is longer than the distance thereof from the panning rotation center 1212 to the imaging center 1211, will rotate around the panning rotation center 1212. A tilting main guide 1214 is a tilting direction guide for indicating the tilting moving direction such that the tilting main guide 1214 overlaps a moving path to be traced by the imaging center 1211 while the imaging unit 111 is driven for tilting.

Then, the display control unit 133 superimposes the panning operation buttons 1217 and tilting operation buttons 1218 onto the display image 1210. The panning operation buttons 1217 are icons used for inputting commands to the panning operation unit 138. In the state illustrated in FIG. 12A, the panning operation buttons 1217 are superimposed onto predetermined positions on the display image 1210. The tilting operation buttons 1218 are icons for inputting commands to the tilting operation unit 139. In the state illustrated in FIG. 3A, the tilting operation buttons 1218 are displayed at both ends of the tilting main guide 1214.

Display positions of the panning operation buttons 1217 on the display image 1210 will be described below. The two panning operation buttons 1217 illustrated in FIG. 12A are displayed line-symmetrically with respect to the tilting main guide 1214 to be equally distant from the panning rotation center 1212. Thus, the two panning operation buttons 1217 are equally distant from any point on the straight line of the tilting main guide 1214. Therefore, the two panning operation buttons 1217 can be displayed on a circle around the panning rotation center 1212 existing on the straight line of the tilting main guide 1214. Then, the distance from the panning rotation center 1212 to the panning operation buttons 1217 is set up to be longer than the distance from the panning rotation center 1212 to the imaging center 1211.

Suppose that, in the state illustrated in FIG. 12A, the user instructs the input apparatus 150 to drive the imaging unit 111 for tilting, the imaging unit 111 is driven for tilting toward the panning rotation center 1212 (in the upward direction in FIG. 12A), and the imaging direction 208 comes close to the panning rotational axis 203. The display image 1210 in this state will be described below with reference to FIG. 12B. As the imaging direction 208 comes close to the panning rotational axis 203, the imaging center 1211 and the panning rotation center 1212 come close to each other. On the other hand, since display positions of the panning operation buttons 1217 remain unchanged after the tilting drive operation is made, the panning main guide 1213 maintains a suitable radius without degrading visibility. Suppose that, in the state illustrated in FIG. 12B, the imaging unit 111 is further driven for tilting toward the panning rotation center 1212 and then the imaging direction 208 coincides with the panning rotational axis 203. The display image 1210 in this state is illustrated in FIG. 12C. In this state, the panning rotation center 1212 derived from state values of the network camera coincides with the imaging center 1211. Since display positions of the panning operation buttons 1217 remain unchanged in this state, the panning main guide 1213 maintains at least a certain fixed radius, enabling an operator to confirm the drive direction and operate the panning operation buttons 1217.

Figure 13A:
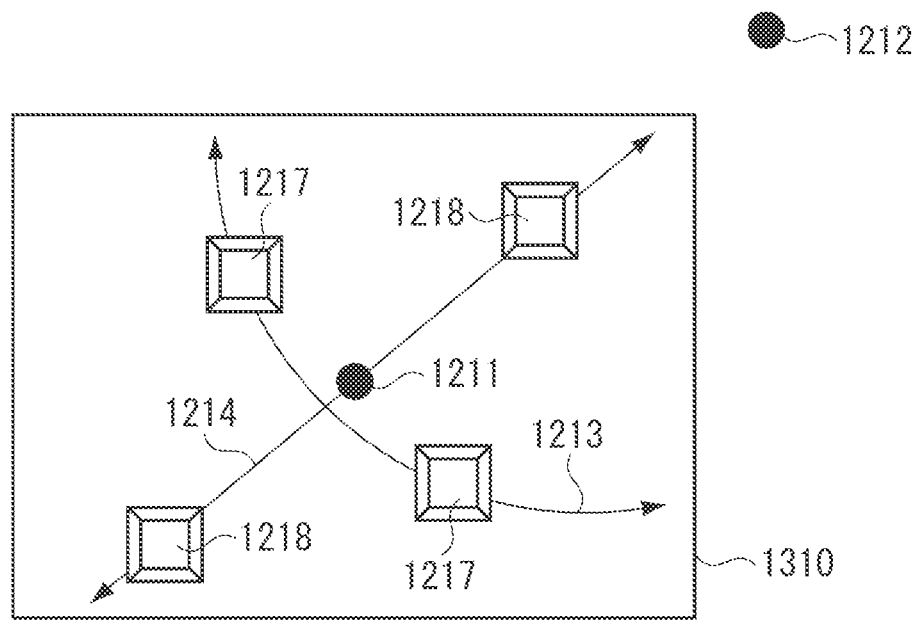
FIGS. 13A and 13B illustrate display images produced when an imaging apparatus according to the fourth exemplary embodiment is driven for rotation.
Figure 13B:
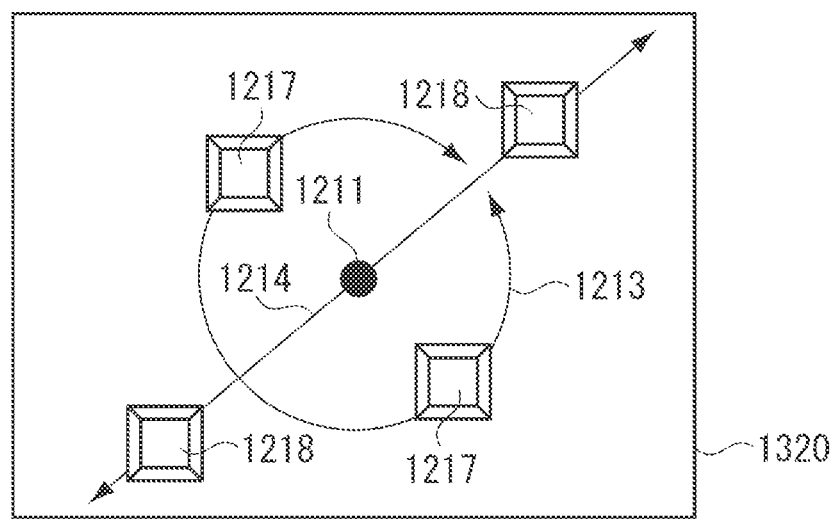

FIGS. 13A and 13B illustrate exemplary display images produced when the rotation mechanism is driven. FIG. 13A illustrates a display image 1310 produced when the rotation mechanism is driven when the imaging direction 208 is close to the perpendicular to the panning rotational axis 203. The display control unit 133 performs display control so that the panning operation buttons 1217 and the tilting operation buttons 1218 are rotated with the drive operation of the rotation mechanism. The panning main guide 1213 and the tilting main guide 1214 are also rotated accordingly. Suppose that, in the state illustrated in FIG. 13A, the imaging unit 111 is driven for tilting toward the panning rotational center 1212 and the imaging direction 208 coincides with the panning rotational axis 203. A display image 1320 in this state is illustrated in FIG. 13B. In this state, since display positions of the panning operation buttons 1217 remain unchanged after the tilting operation is made, the panning main guide 1213 maintains a certain fixed radius, enabling the operator to operate each mechanism by using the operation buttons without degrading visibility. Thus, even when the optical axis of the imaging apparatus 110 comes close to the panning rotational axis 203, the imaging control system according to the present exemplary embodiment can suitably display the panning operation icons.

Operations of the imaging control system according to the present exemplary embodiment are similar to those of the imaging control system illustrated in FIGS. 5 and 6, and duplicated explanation will be omitted.

The imaging control system according to the fourth exemplary embodiment displays the panning operation buttons 1217 at predetermined positions on the display image 1310 or 1320 such that the distance from the panning rotational center 1212 to the panning operation buttons 1217 is longer than the distance from the panning rotation center 1212 to the imaging center 1211 while the imaging unit 111 is driven for panning and tilting. With the imaging control system according to the fourth exemplary embodiment, the panning main guide 1213 is superimposed onto the captured image such that the panning main guide 1213 constantly passes through the panning operation buttons 1217. Therefore, even when the optical axis of the imaging apparatus 110 comes close to the panning rotational axis 203, the panning operation icons can be displayed.

The first to fourth exemplary embodiments have been specifically described based on a case where the imaging apparatus 110 is provided with the rotation mechanism. In a case where the imaging apparatus 110 is not provided with the rotation mechanism, virtual rotation can be performed by rotating the image on the client apparatus 130. The present invention can be implemented even with such a configuration. Even in this case, similar to a case where the imaging unit 111 is driven for rotation, the imaging apparatus 110 can show the user the panning and tilting drive directions even when the optical axis of the imaging apparatus 110 comes close to the panning rotational axis 203.

Although the first to fourth exemplary embodiments display a tilting main guide in addition to a panning main guide and panning sub guides, only the panning sub guides may be displayed. Even when only the panning sub guides are displayed, the first to fourth exemplary embodiments can suitably show the user the moving direction of the imaging area without losing a panning direction guide when the imaging unit 111 is driven for tilting. The client apparatus 130 described in the first to fourth exemplary embodiments may be integrated with the imaging apparatus 110. Specifically, the present invention can be implemented even after the client apparatus 130 superimposes the panning main guide 313 and the panning sub guide 315 onto the captured image captured by the imaging apparatus 110 and then transmits a display image to the display apparatus 170 via the network 190.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-197840 filed Sep. 3, 2010 and No. 2010-198775 filed Sep. 6, 2010, which are hereby incorporated by reference herein in their entirety.

What is claimed is:

1. A control apparatus for changing a viewing angle of an imaging unit by controlling panning and tilting angles of the imaging unit, the control apparatus comprising:
   an acquisition unit configured to acquire a captured image captured by the imaging unit;
   an angle control unit configured to control panning and tilting angles of the imaging unit; and
   a display control unit configured to cause a display unit to display, on the captured image, at least one of panning direction guides indicating that a viewing angle of the imaging unit changes along at least one of the panning direction guides by changing panning angle of the imaging unit, at least one of the panning direction guides having different radiuses each other;
   wherein the number of at least one of the panning direction guides displayed on the captured image is decreased by the display control unit and each radius of at least one of the panning direction guides is reduced by the display control unit if the viewing angle moves close to a panning rotation center to control of the panning angles.

2. The control apparatus according to claim 1, wherein the display control unit causes the display unit to display two icons on the captured image for inputting a command to control the panning angle, each position of the two icons being symmetrical to a straight line indicating a tilting direction guide for changing the tilting angle and being through a center of the captured image.

3. The control apparatus according to claim 2, wherein each position of the two icons remains regardless of changing panning angles by the angle control unit.

4. The control apparatus according to claim 2, wherein each positions of the two icons is displayed on a panning direction guides which has the largest radius compared to other displayed panning direction guides if the viewing angle moves close to a panning rotation center to control of the panning angles.

5. A method for changing a viewing angle of an imaging unit by controlling panning and tilting angles of the imaging unit, the method comprising:
   acquiring a captured image captured by the imaging unit;
   controlling panning and tilting angles of the imaging unit; and
   causing a display unit to display, on the captured image, at least one of panning direction guides indicating that a viewing angle of the imaging unit changes along at least one of the panning direction guides by changing panning angle of the imaging unit, at least one of the panning direction guides having different radiuses each other;
   wherein the number of at least one of the panning direction guides displayed on the captured image is decreased and each radius of at least one of the panning direction guides is reduced if the viewing angle moves close to a panning rotation center to control of the panning angles.

6. The method according to claim 5, wherein the display unit is caused to display two icons on the captured image for inputting a command to control the panning angle, each position of the two icons being symmetrical to a straight line indicating a tilting direction guide for changing the tilting angle and being through a center of the captured image.

7. The method according to claim 6, wherein each position of the two icons remains regardless of changing panning angles.

8. The method according to claim 6, wherein each positions of the two icons is displayed on a panning direction guides which has the largest radius compared to other displayed panning direction guides if the viewing angle moves close to a panning rotation center to control of the panning angles.

9. A non-transitory computer-readable storage medium storing a program for causing a control apparatus to change a viewing angle of an imaging unit by controlling panning and tilting angles of the imaging unit, the method comprising:
   acquiring a captured image captured by the imaging unit;
   controlling panning and tilting angles of the imaging unit; and
   causing a display unit to display, on the captured image, at least one of panning direction guides indicating that a viewing angle of the imaging unit changes along at least one of the panning direction guides by changing panning angle of the imaging unit, at least one of the panning direction guides having different radiuses each other;
   wherein the number of at least one of the panning direction guides displayed on the captured image is decreased and each radius of at least one of the panning direction guides is reduced if the viewing angle moves close to a panning rotation center to control of the panning angles.

10. The non-transitory computer-readable storage medium according to claim 9, wherein the display unit is caused to display two icons on the captured image for inputting a command to control the panning angle, each position of the two icons being symmetrical to a straight line indicating a tilting direction guide for changing the tilting angle and being through a center of the captured image.

11. The non-transitory computer-readable storage medium according to claim 10, wherein each position of the two icons remains regardless of changing panning angles.

12. The non-transitory computer-readable storage medium according to claim 10, wherein each positions of the two icons is displayed on a panning direction guides which has the largest radius compared to other displayed panning direction guides if the viewing angle moves close to a panning rotation center to control of the panning angles.

* * * * *